United States Patent
Koch et al.

(10) Patent No.: US 8,447,787 B2
(45) Date of Patent: *May 21, 2013

(54) SYSTEM AND METHOD FOR GEOCODING CONTENT

(75) Inventors: Edward Lee Koch, San Rafael, CA (US); Daniel Allan Hennage, Mill Valley, CA (US); Wesley Clay Collier, Piedmont, CA (US)

(73) Assignee: Geopeg, Inc., Piedmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,076

(22) Filed: Jun. 5, 2012

(65) Prior Publication Data

US 2012/0246198 A1 Sep. 27, 2012

Related U.S. Application Data

(63) Continuation of application No. 13/014,600, filed on Jan. 26, 2011, now Pat. No. 8,200,712, which is a continuation of application No. 11/645,001, filed on Dec. 23, 2006, now Pat. No. 7,904,483, said application No. 13/014,600 is a continuation of application No. 12/571,547, filed on Oct. 1, 2009, now Pat. No. 7,917,543, which is a continuation of application No. 11/645,001, filed on Dec. 23, 2006, now Pat. No. 7,904,483.

(60) Provisional application No. 60/774,931, filed on Feb. 21, 2006, provisional application No. 60/792,211, filed on Apr. 17, 2006, provisional application No. 60/793,928, filed on Apr. 24, 2006.

(51) Int. Cl.
G06F 7/00 (2006.01)
G06F 17/30 (2006.01)

(52) U.S. Cl.
USPC .......................................... 707/798; 707/802

(58) Field of Classification Search
None
See application file for complete search history.

(56) References Cited

U.S. PATENT DOCUMENTS

| | | | |
|---|---|---|---|
| 6,118,404 A * | 9/2000 | Fernekes et al. | 342/357.43 |
| 6,321,158 B1 | 11/2001 | DeLorme et al. | |
| 6,681,231 B1 | 1/2004 | Burnett | |
| 6,853,332 B1 * | 2/2005 | Brookes | 342/191 |
| 6,985,588 B1 | 1/2006 | Glick et al. | |
| 2002/0003571 A1 * | 1/2002 | Schofield et al. | 348/148 |
| 2002/0026289 A1 * | 2/2002 | Kuzunuki et al. | 702/150 |

(Continued)

OTHER PUBLICATIONS

USPTO Portal Search: "(geo-located and objects and location and component and associated and 'data structure' and 'auxiliary information' and 'Data Sheet)'". Search results 1-20. Oct. 21, 2010.

(Continued)

*Primary Examiner* — Kuen Lu
(74) *Attorney, Agent, or Firm* — Michael A. Kerr; Kerr IP Group, LLC

(57) ABSTRACT

A system and method for generating a virtual tour on a display device is described. The method comprises providing at least one map. The method further comprises providing a plurality of sequenced images, wherein each of the images is associated with at least one location by a geo-coding module configured to generate a geo-location object data sheet that associates sequential images with a corresponding location. The sequenced images are organized based on the location of each of the sequenced images and displayed on the map. The method is implemented by the system.

27 Claims, 26 Drawing Sheets

U.S. PATENT DOCUMENTS

| | | | |
|---|---|---|---|
| 2002/0055924 A1 | 5/2002 | Liming | |
| 2004/0019584 A1 | 1/2004 | Greening et al. | |
| 2004/0229620 A1* | 11/2004 | Zhao et al. | 455/445 |
| 2005/0009573 A1* | 1/2005 | Tokkonen | 455/567 |
| 2005/0063563 A1* | 3/2005 | Soliman | 382/104 |
| 2005/0209815 A1* | 9/2005 | Russon et al. | 702/150 |
| 2005/0228860 A1* | 10/2005 | Hamynen et al. | 709/203 |
| 2006/0145892 A1 | 7/2006 | Gueziec | |
| 2006/0241860 A1 | 10/2006 | Kimchi et al. | |
| 2007/0032244 A1* | 2/2007 | Counts et al. | 455/456.1 |

OTHER PUBLICATIONS

USPTO Portal Search: "(geo and located and objects and location and component and associated and data and structure and auxiliary and information and Data and Sheet)". Search results 1-6. Oct. 21, 2010.

Google Web Search: "System and method for presenting geo-located objects". Search results 1-10. Oct. 21, 2010.

United States Patent and Trademark Office: IEEE Xplore Digital Library Search: "geolocated object and data sheet and auxiliary information". Search results 1-3. Oct. 21, 2010.

United States Patent and Trademark Office: IEEE Xplore Digital Library Search: "((Geocoding)<in>metadata)". Search results 76-94. Jun. 26, 2009.

United States Patent and Trademark Office: IEEE Xplore Digital Library Search: "((Geocoding)<in>metadata)". Search results 51-75. Jun. 26, 2009.

United States Patent and Trademark Office: IEEE Xplore Digital Library Search: "((Geocoding)<in>metadata)". Search results 26-50. Jun. 26, 2009.

United States Patent and Trademark Office: IEEE Xplore Digital Library Search: "((Geocoding)<in>metadata)". Search results 1-25. Jun. 26, 2009.

Google Web Search: "generate geocoding geolocated object data sheet that associates user generated content". Search results 1-85. Jun. 26, 2009.

Google Web Search: "geocoding module configured generate geolocated object data sheet". Search results 1-93. Jun. 26, 2009.

USPTO Portal Search: "(generate and geo-located and object and data and sheet and associates and user and generated and content)". Search results 1-20. Jun. 26, 2009.

USPTO Portal Search: "(generate and geo-coding and object and data and sheet and associates and user and generated and content)". Search results 1-20. Jun. 26, 2009.

USPTO Portal Search: "(generate and geocoding and geolocated and object and data and sheet and that and associates and user and generated and content)". Search results 1-20. Jun. 26, 2009.

Ratcliffe, Jerry H. "On the accuracy of Tiger-type geocoded address data in relation to cadastral and census areal units". International Journal of Geographical Information Science. Research Article, vol. 15, No. 5, 0 pp. 473-485. 2001 Taylor and Francis Ltd.

Wikipedia Search: "Geocoding". http://en.wikipedia.org/wiki/Geocoding. Dec. 14, 2006.

\* cited by examiner

Example Data Sources

SYSTEM AND METHOD FOR GEOCODING CONTENT

CROSS REFERENCE

This patent application is a continuation of non-provisional patent application Ser. No. 13/014,600 filed on Jan. 26, 2011, which is a continuation of non-provisional patent application Ser. No. 11/645,001 now U.S. Pat. No. 7,904,483 filed on Dec. 23, 2006, which claims the benefit of provisional patent applications 60/774,931 filed on Feb. 21, 2006, 60/792,211 filed on Apr. 17, 2006, and 60/793,928 filed on Apr. 24, 2006, all of which are hereby incorporated by reference.

Additionally, non-provisional patent application Ser. No. 13/014,600 is a continuation of non-provisional patent application Ser. No. 12/571,547 now U.S. Pat. No. 7,917,543 filed on Oct. 1, 2009, which is a continuation of non-provisional patent application Ser. No. 11/645,001 now U.S. Pat. No. 7,904,483 filed on Dec. 23, 2006, and which claims the benefit of provisional patent applications 60/774,931 filed on Feb. 21, 2006, 60/792,211 filed on Apr. 17, 2006, and 60/793,928 filed on Apr. 24, 2006, all of which are hereby incorporated by reference.

BACKGROUND

1. Field of the Invention

The invention relates to a system and method for geocoding user generated content. More particularly, the invention relates to a system and method for geo-coding a plurality of user generated content.

2. Description of Related Art

With the widespread use of Global Position System (GPS) sensors, geographic identifiers are commonly used to track vehicles and to help drivers find a particular location. Geocoding is the process of assigning geographic identifiers such as latitude, longitude, or Universal Transverse Mercator (UTM) to information. The information having the geographic coordinates can be mapped and entered into a Geographic Information System (GIS). These location tags may also take the form of an actual address which can be translated into latitude and longitude.

An illustrative example of geocoded information is a geocoded photo. The geocoded photo is an image that is associated with a geographical location. A geocoded image can be associated to geographic coordinates such as latitude and longitude or a physical address. In theory, every part of a picture can be tied to geographic location, but in the most typical application, only the position of the photograph is associated with the entire digital image.

There are various methods for geocoding images. For example, using a location aware device such as a GPS receiver, the location of the camera used to take a particular photo is recorded. Although most digital cameras presently available do not contain a built in GPS receiver, an external GPS device can be used to keep track of the camera location and the data can be synchronized using specialized software.

Regretfully, the process of geo-coding user generated content is relatively challenging and time consuming task. For example, the currently available location aware devices are specialized devices that do not integrate with other electronic devices that may be used to gather or capture user generated content. Thus, it becomes quite challenging to geo-code user generated content that is generated from a first device with location specific content that is generated by another device that has different capabilities.

It would therefore be beneficial to provide a simplified system and method for geo-coding user generated content.

SUMMARY

A system and method for generating a virtual tour on a display device is described. The method comprises providing at least one map. The method further comprises providing a plurality of sequenced images, wherein each of the images is associated with at least one location by a geo-coding module configured to generate a geo-location object data sheet that associates sequential images with a corresponding location. The sequenced images are organized based on the location of each of the sequenced images and displayed on the map. The method is implemented by the system.

DRAWINGS

References to the following drawings are for illustrative purposes and not for limiting purposes. The following drawings describe one or more illustrative embodiments.

Figure 12:
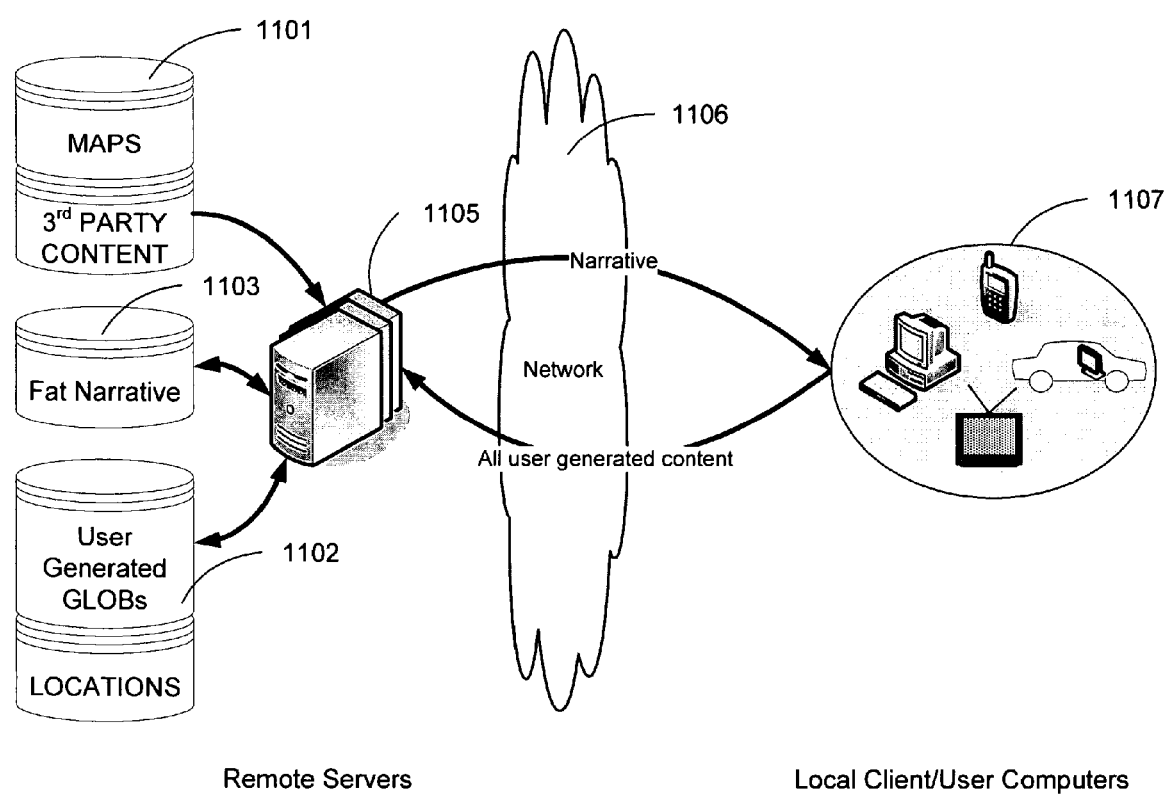

FIG. 12 presents an illustrative system architecture with fat servers and thin clients.

Figure 13:
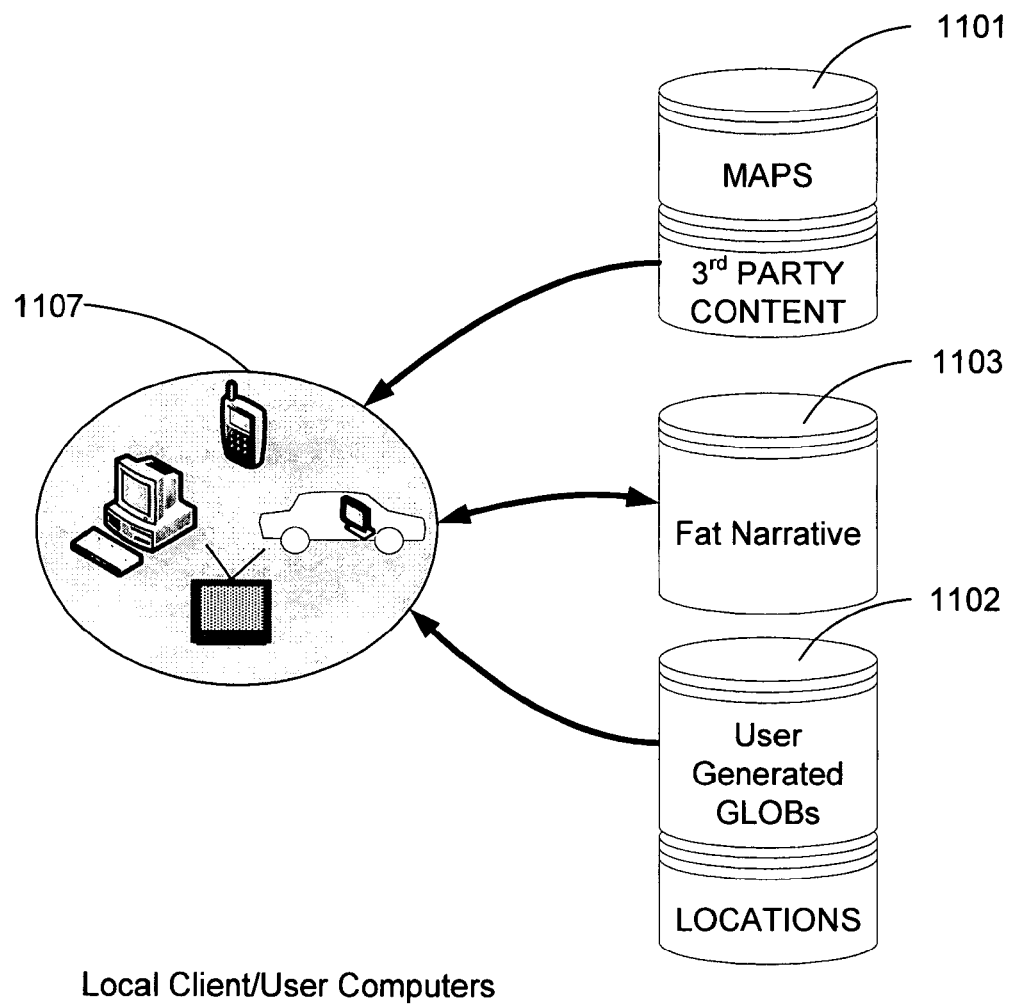

FIG. 13 presents an illustrative system architecture with no remote servers.

Figure 14:
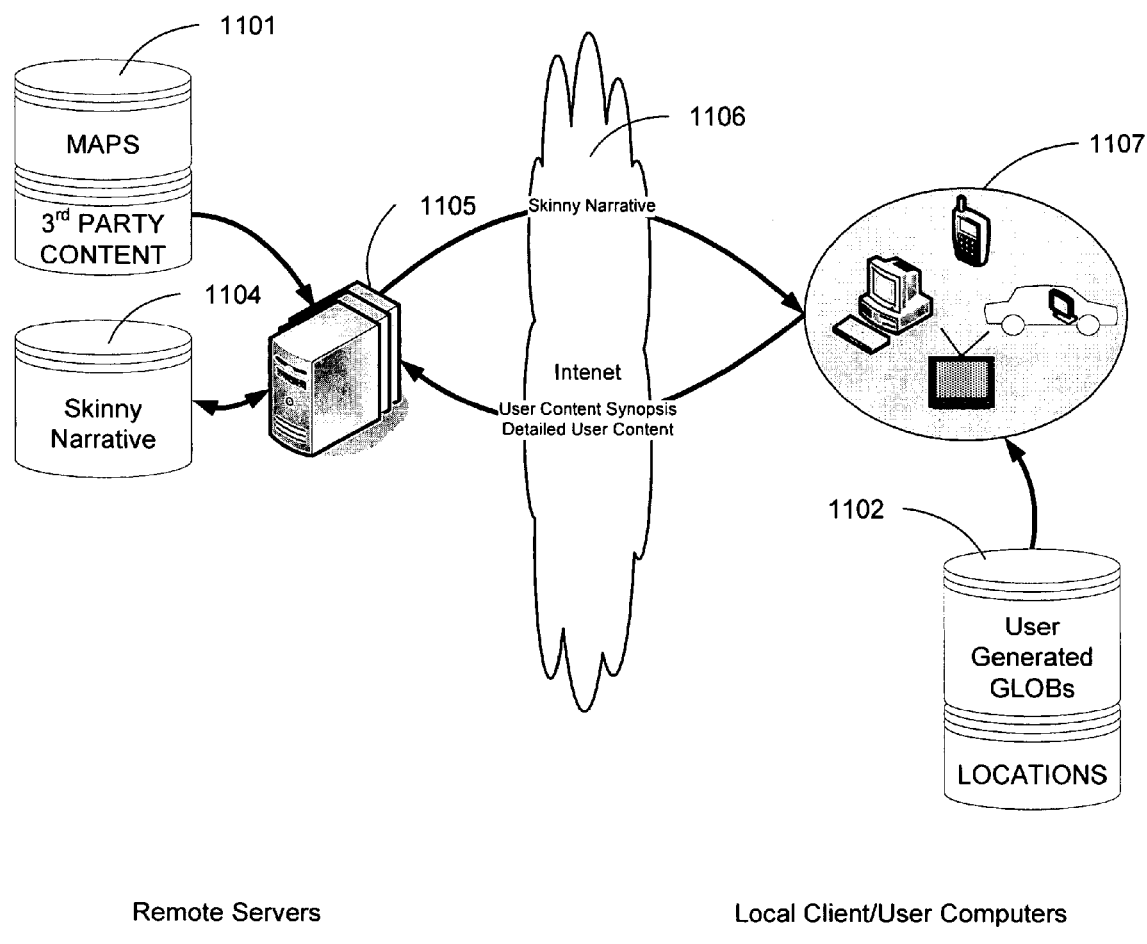

FIG. 14 presents an illustrative system architecture with remote servers that generate skinny Chronicles or Narratives.

Figure 15:
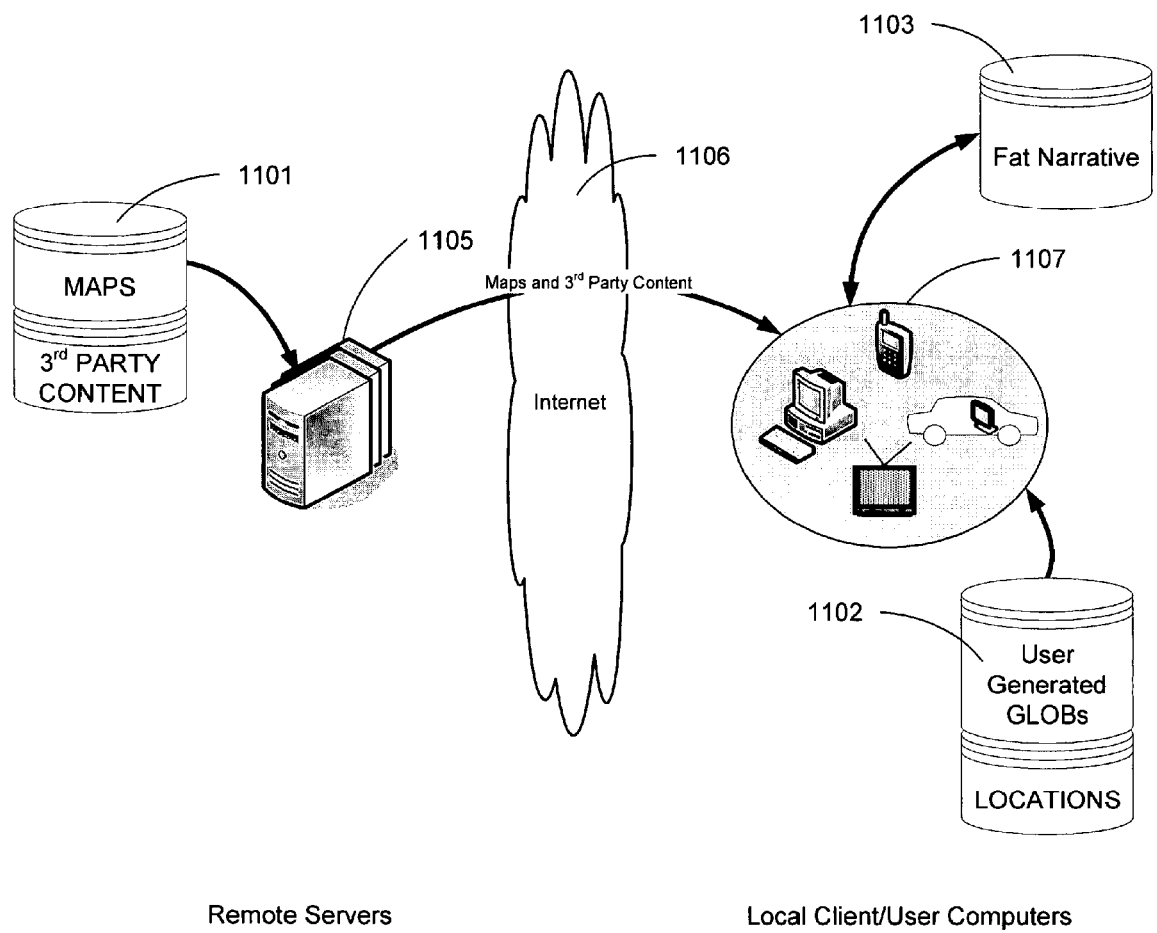

FIG. 15 presents an illustrative system architecture with remote servers and clients generating the Chronicle or Narratives.

Figure 16:
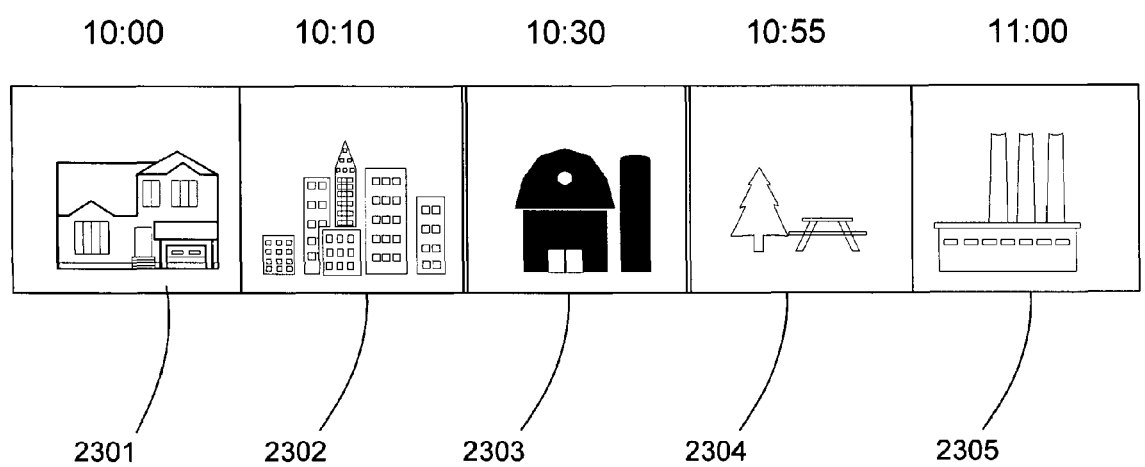

FIG. 16 provides an illustrative depiction of a time stamped photographs.

Figure 17:
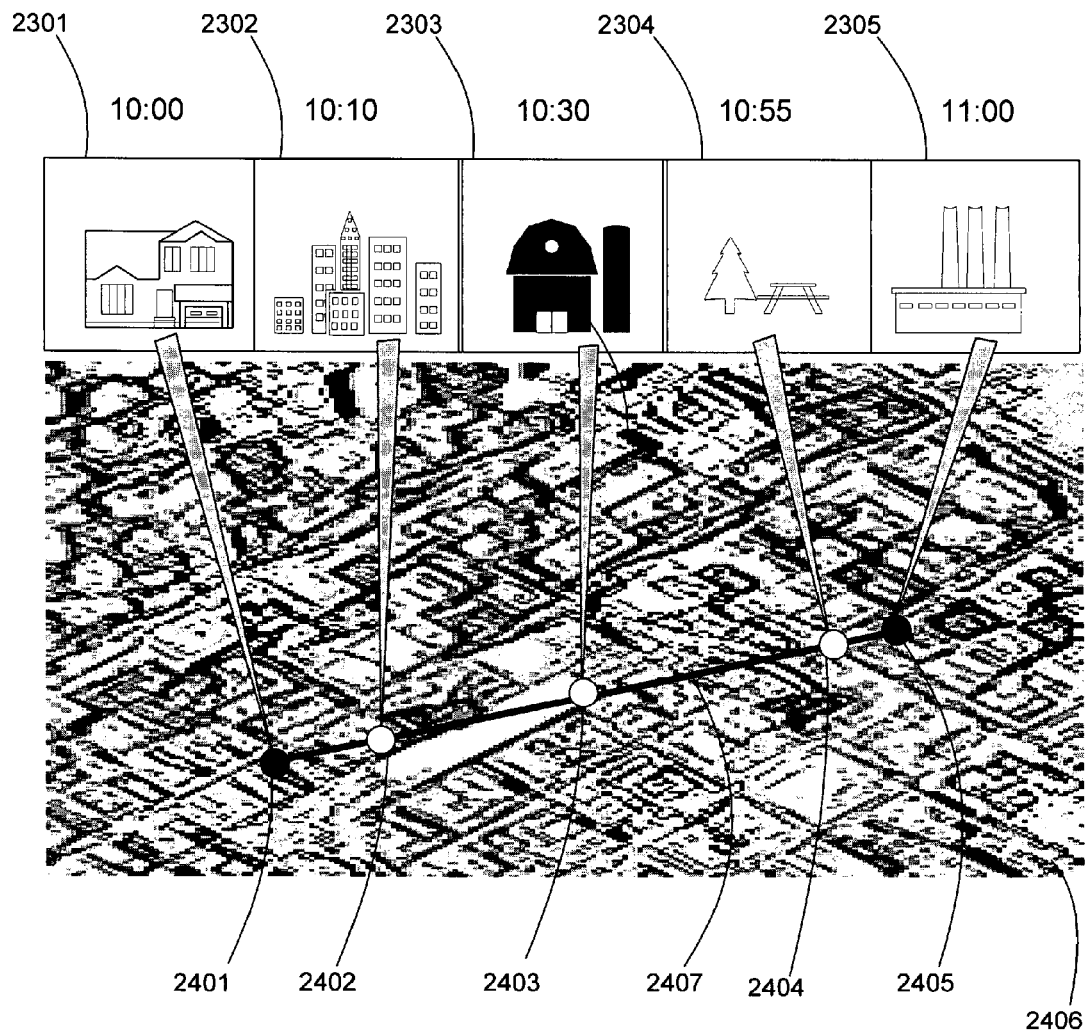

FIG. 17 illustrates the explicit and implicit geocoding of photographs.

Figure 18:
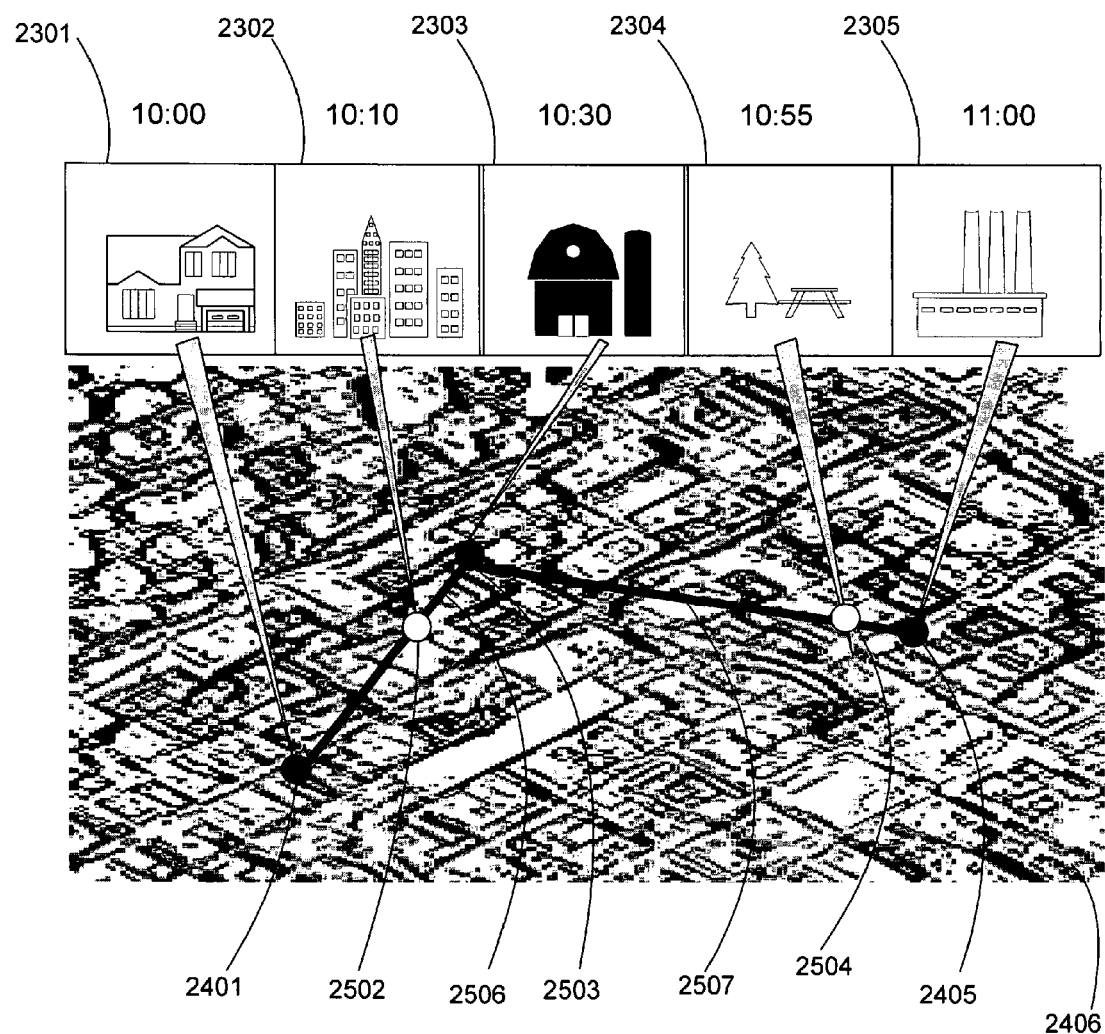

FIG. 18 further illustrates explicit and implicit geocoding of photographs.

Figure 19:
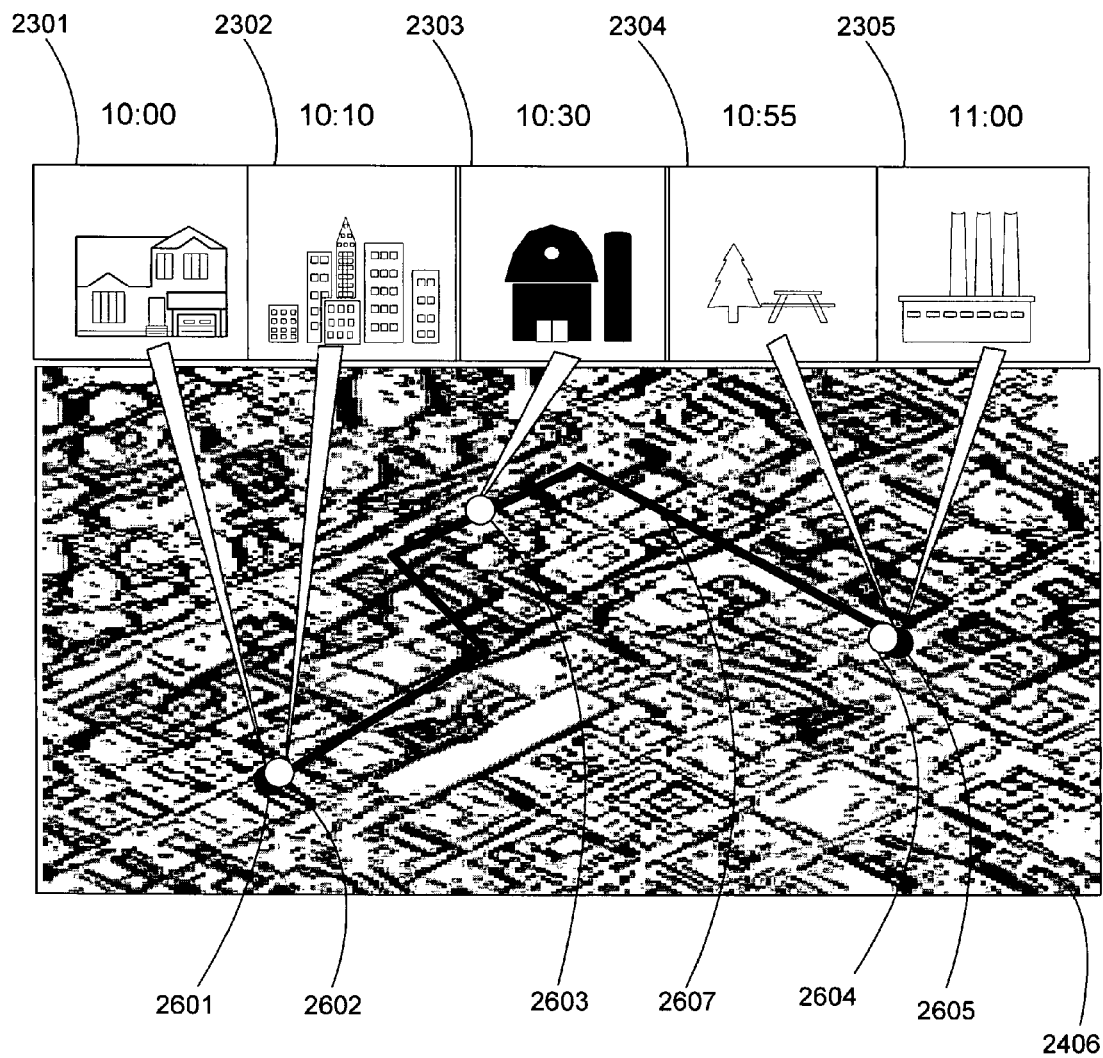

FIG. 19 provides an illustrative example of implicit geocoding based on different path and distribution rules.

Figure 20:
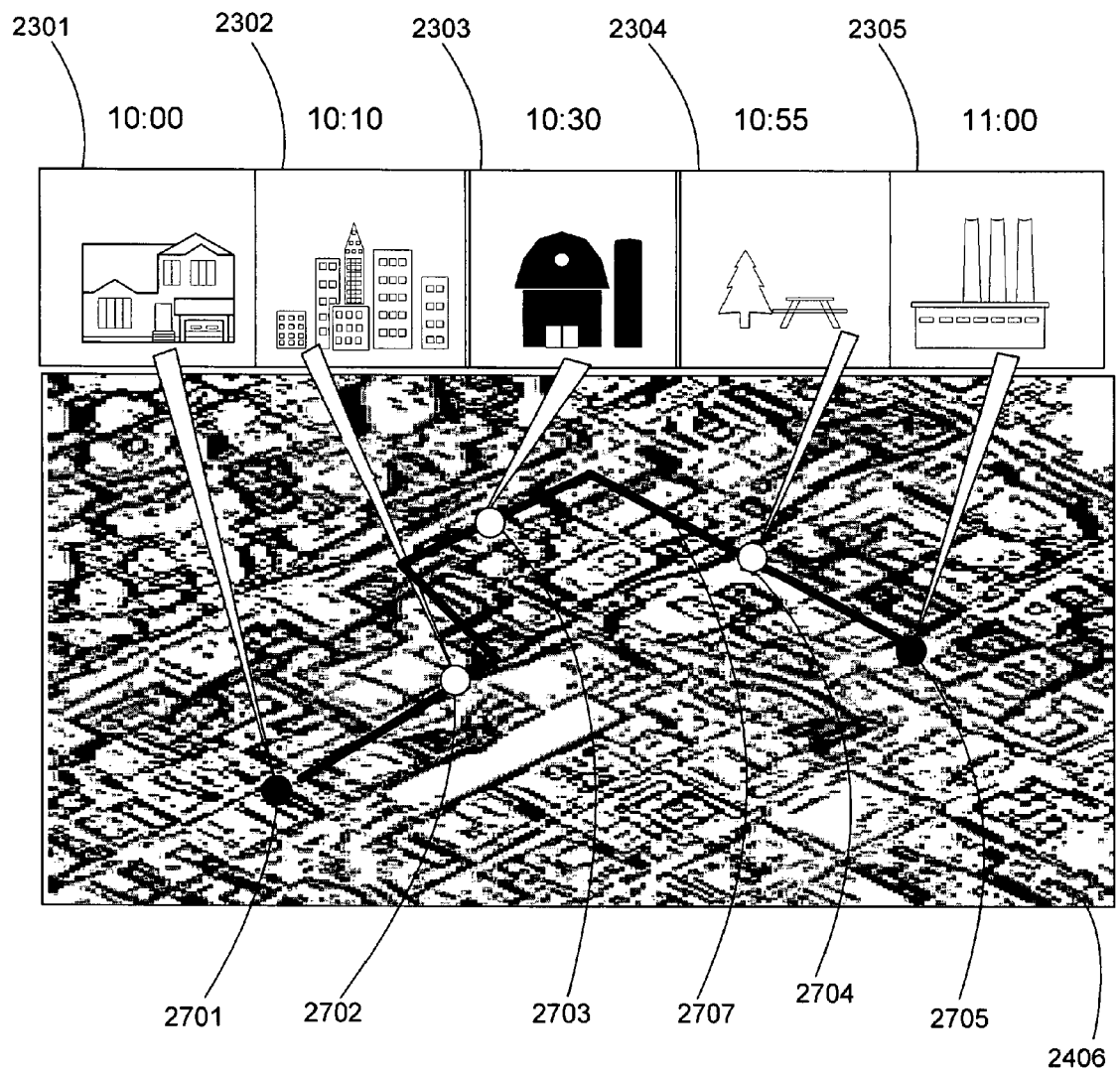

FIG. 20 provides an illustrative example of implicit geocoding of a user defined photograph sequence with no time stamps.

Figure 21:
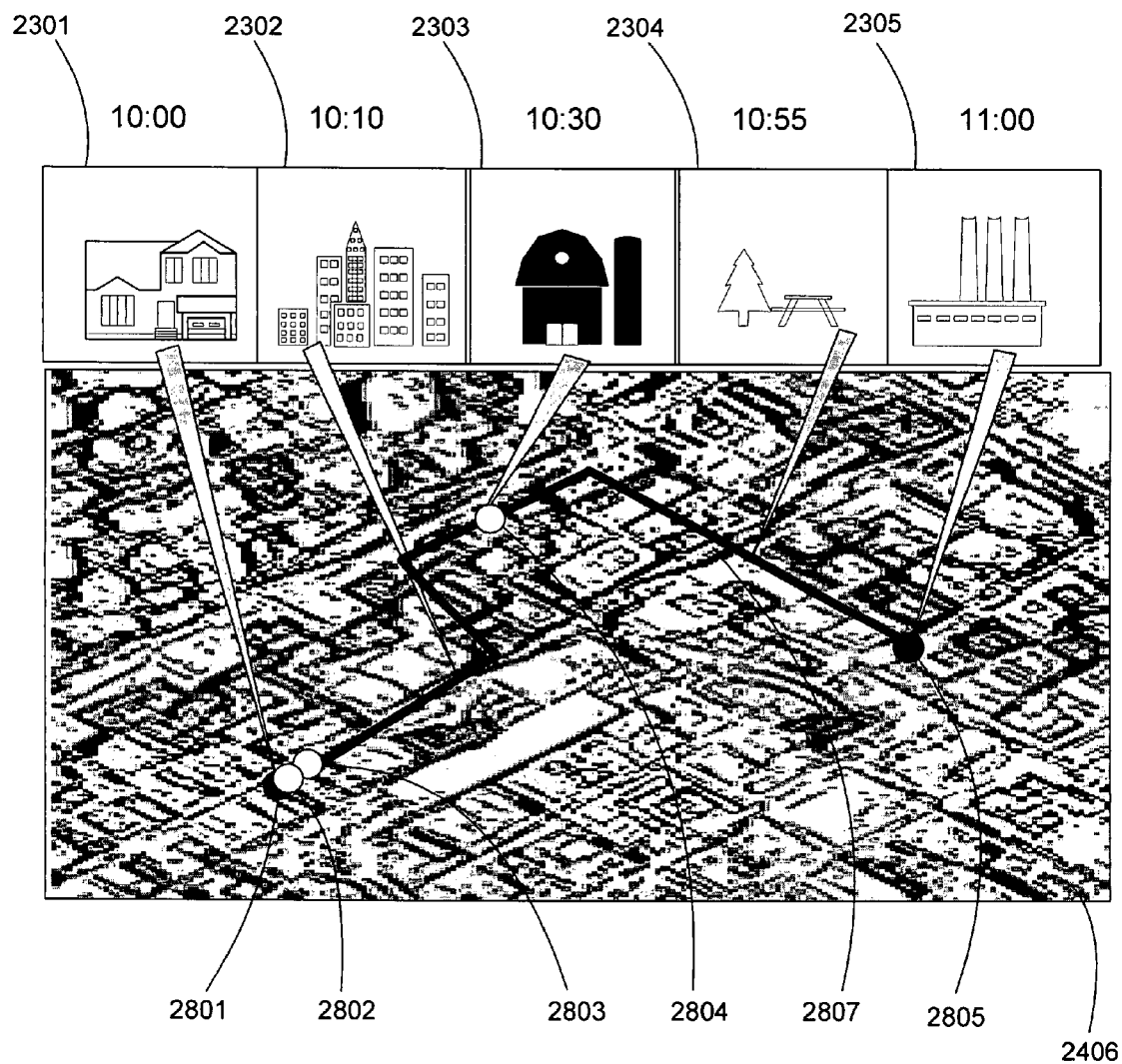

FIG. 21 provides an illustrative example of implicit geocoding of a user defined photograph sequence with no time stamps and additional relationship rules.

Figure 22:
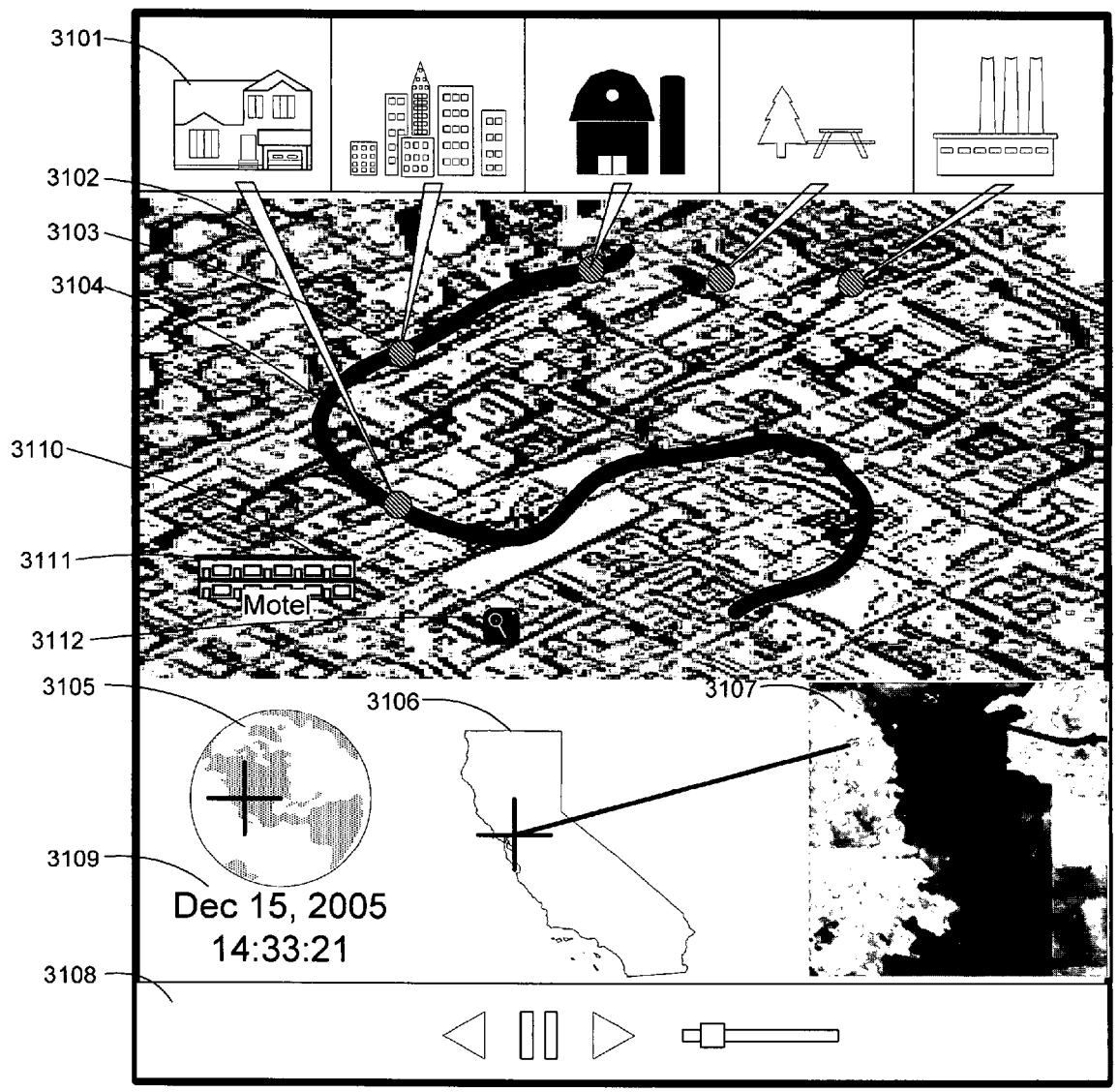

FIG. 22 provides an illustrative Virtual Tour.

Figure 23:
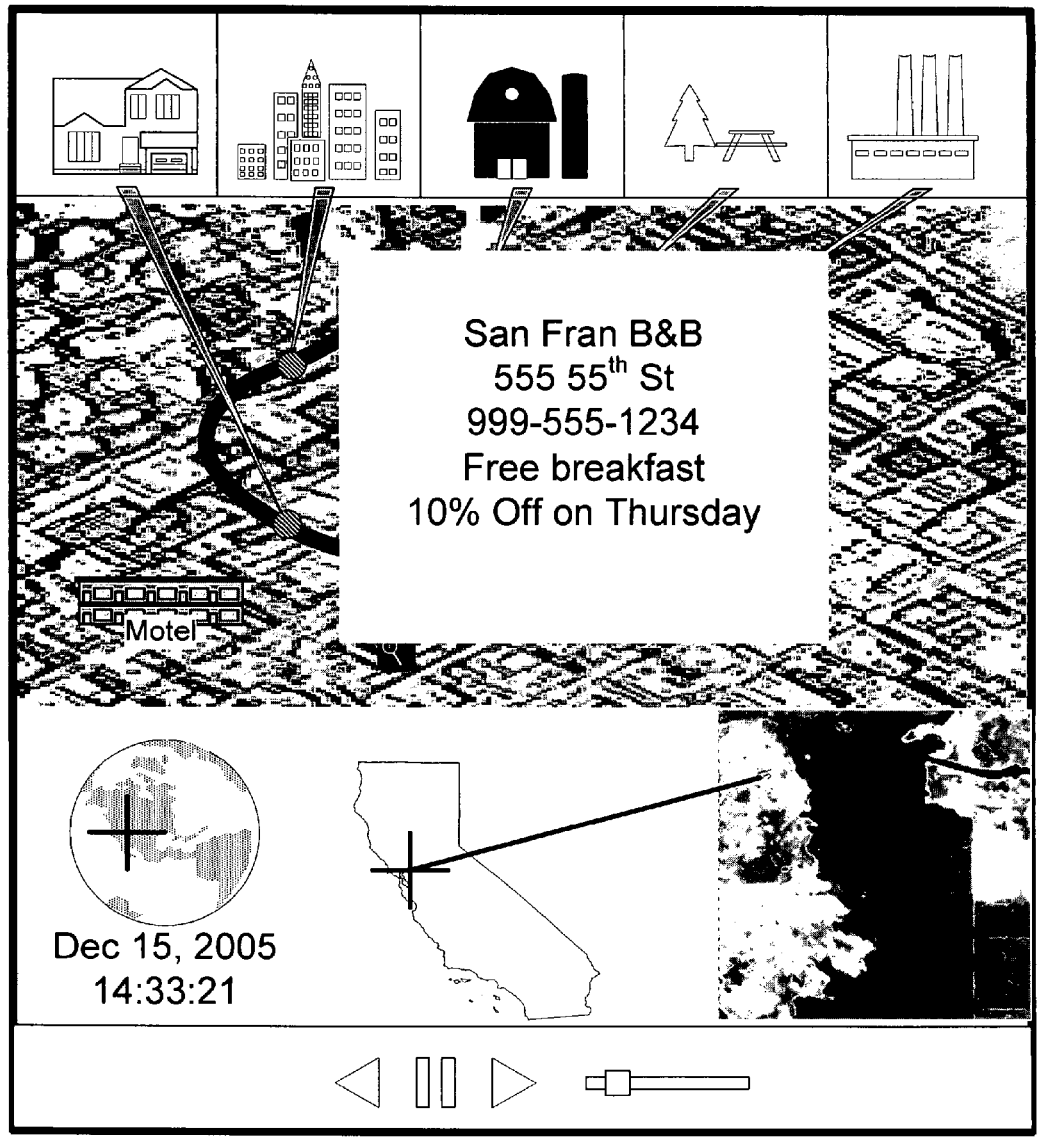

FIG. 23 shows an illustrative display with detail for a selected Point of Interest.

Figure 24:
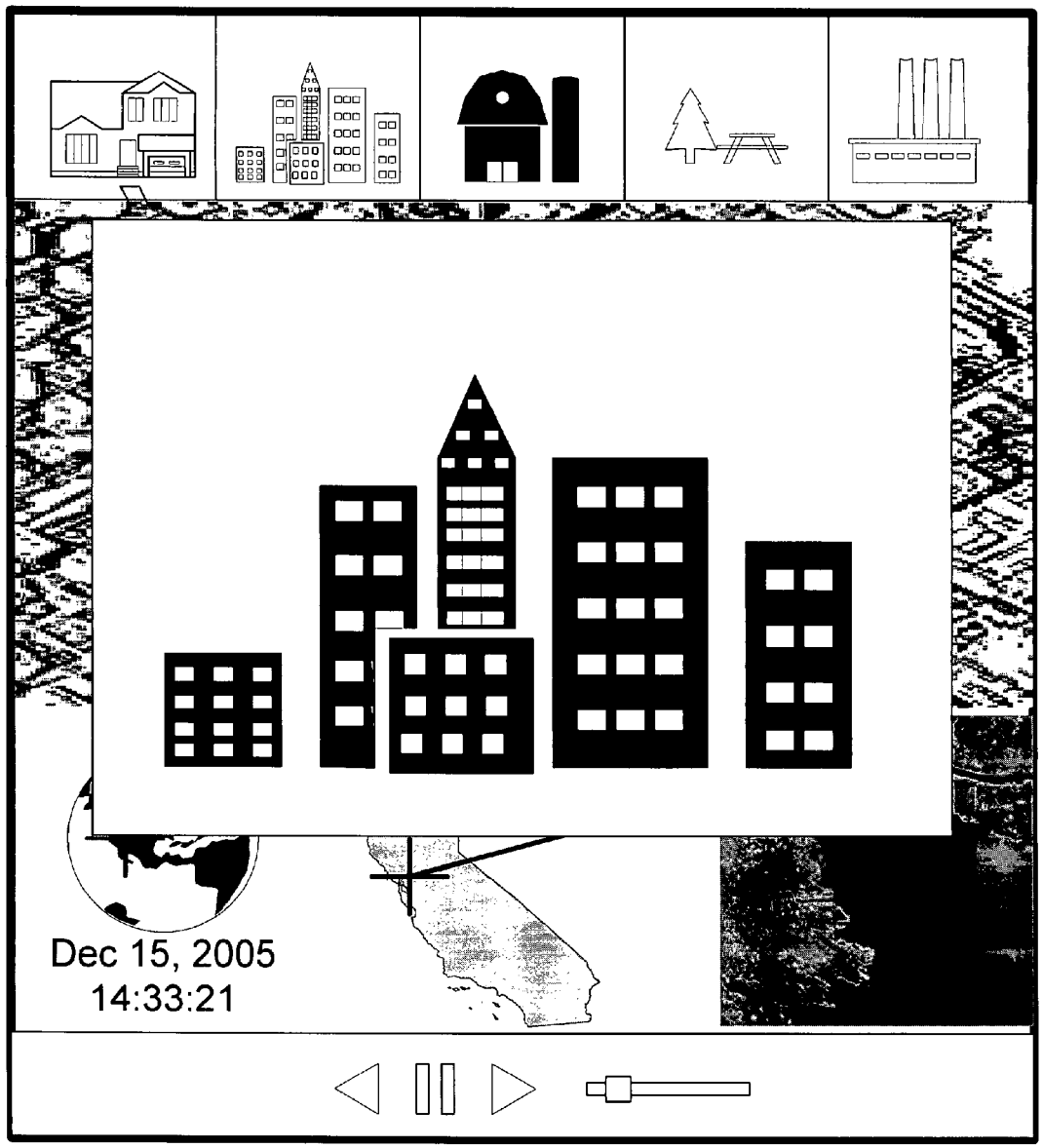

FIG. 24 shows an illustrative display of a selected geolocated image.

Figure 25:
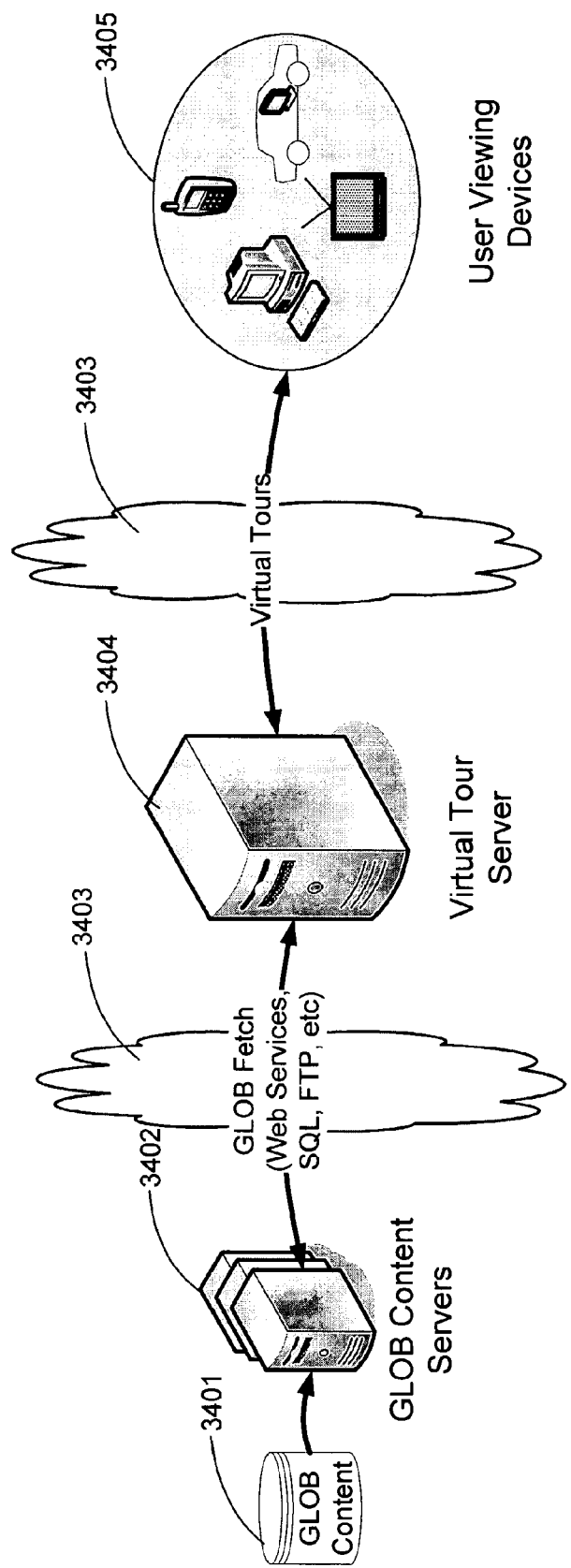

FIG. 25 presents an illustrative system architecture for an illustrative virtual tour server.

Figure 26:
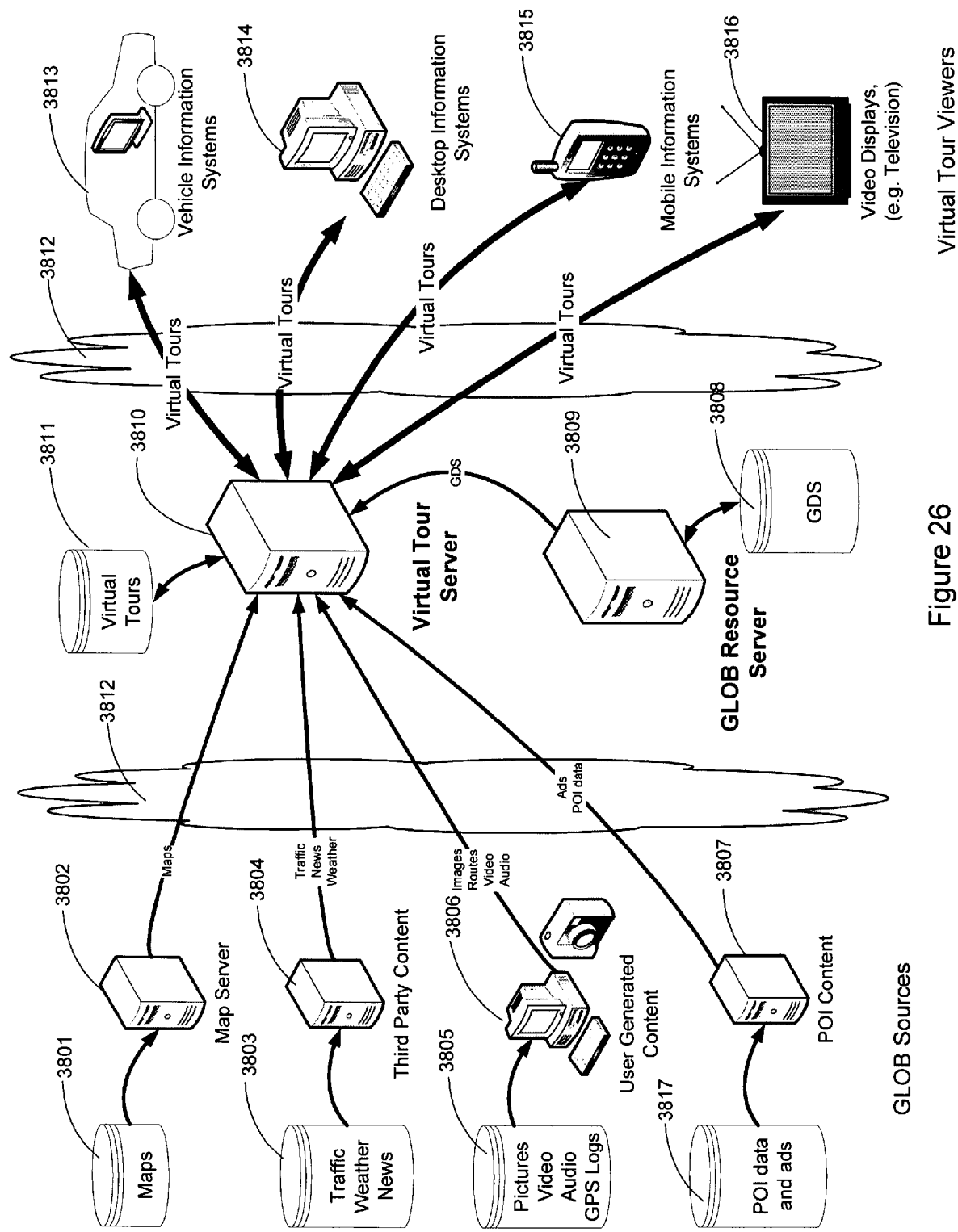

FIG. 26 presents an illustrative system architecture for a more detailed virtual tour server architecture.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems described hereinafter may vary as to configuration, as to details, and as to the functionality of system elements. Additionally, the method may vary as to details, partitioning, repetition, act inclusion, order of the actions, or other variations without departing from the illustrative method disclosed herein.

As described above, geocoding an object refers to associating location or geographic information, i.e. a geocode, with the particular object. Geocodes are also referred to as geolocations. For purposes of this patent application, an object that has an associated geocode is referred to as a geo-located object, hereinafter "GLOB." The GLOB is a piece of information tagged with the geographic location of the content of the information.

Figure 1:
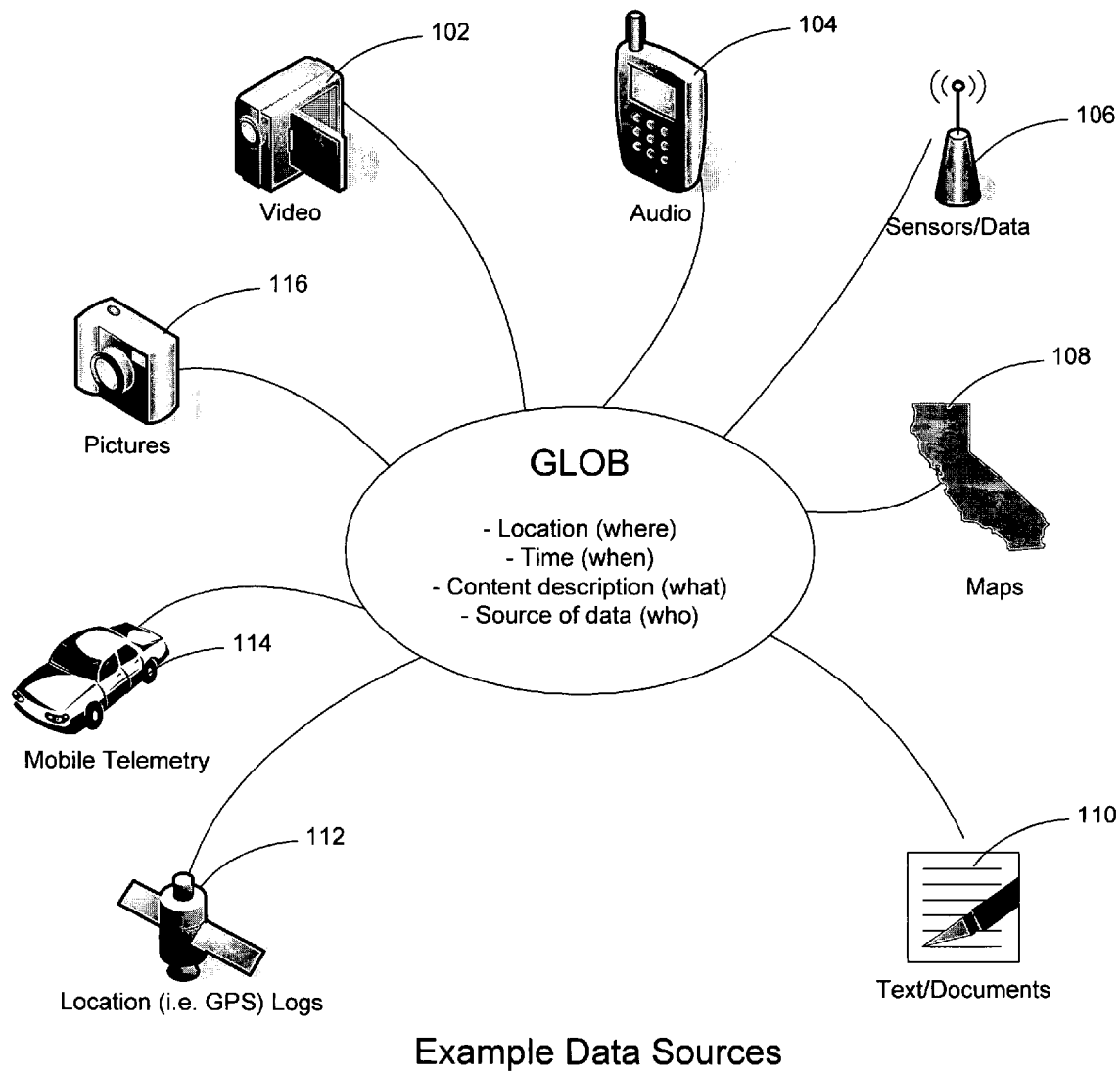
FIG. 1 shows illustrative examples of information converted to a geo-location object ("GLOB").

Referring to FIG. 1 there is shown illustrative examples of information that may be converted to a GLOB. More particularly, FIG. 1 shows an illustrative example of a plurality of sources of information that can be turned into a GLOB such as video, audio, sensors/data, maps, text/document, location, i.e. GPS logs, mobile telemetry, and pictures. Additionally, the attributes associated with each GLOB are shown: location (where); time (when); content description (what); and source of data (who).

A description of a system that can be used to present one or more GLOBs is described. Additionally, a system to animate GLOBs that are indexed by time and that include geographic information is also described. Additionally, GLOB information may be presented in a synopsized form that allows the user to obtain detail about a particular object. Additionally, a plurality GLOBs can be generated from a plurality of different sources of information. The systems and methods described herein may also be used to geocode multiple objects and to organize the GLOBs. For example, geocoding of multiple objects that are sequenced in relation to one another is described. The systems and methods take advantage of the objects belonging to the same group. Finally, the systems and methods can be used to generate virtual tours where the virtual tour is a visual and/or audio presentation of what one might experience when visiting a particular location.

By way of example and not of limitation, a GLOB could be a digital photograph that is tagged with the time and location at which the photograph was taken. The content of the photograph is the photographic image itself. There may also be tags which describe who took the photograph and the subject matter of the photograph.

Other illustrative information that can be converted to a GLOB includes, but is not limited to, maps, videos, recorded location logs (e.g. GPS logs), audio recordings, weather reports, news items, sensor measurements, automotive telemetry such as location, speed, camera images, and any other means for generating content. The examples of information presented above are referred to as "generated content" or sometimes just "content" for short. The content described can be grouped together into sets of related objects. For example, in the case of photographs, a user might decide to group together a collection of photographs that were taken around the same time frame as a particular trip or event.

In addition to location information and possibly temporal information, GLOBs may be tagged with other state information such as altitude, heading, and azimuth. GLOBs may also be tagged with motion state parameters such as speed, acceleration, and bearing. The location may have a further qualifier that specifies the accuracy and resolution of the location.

Figure 2:
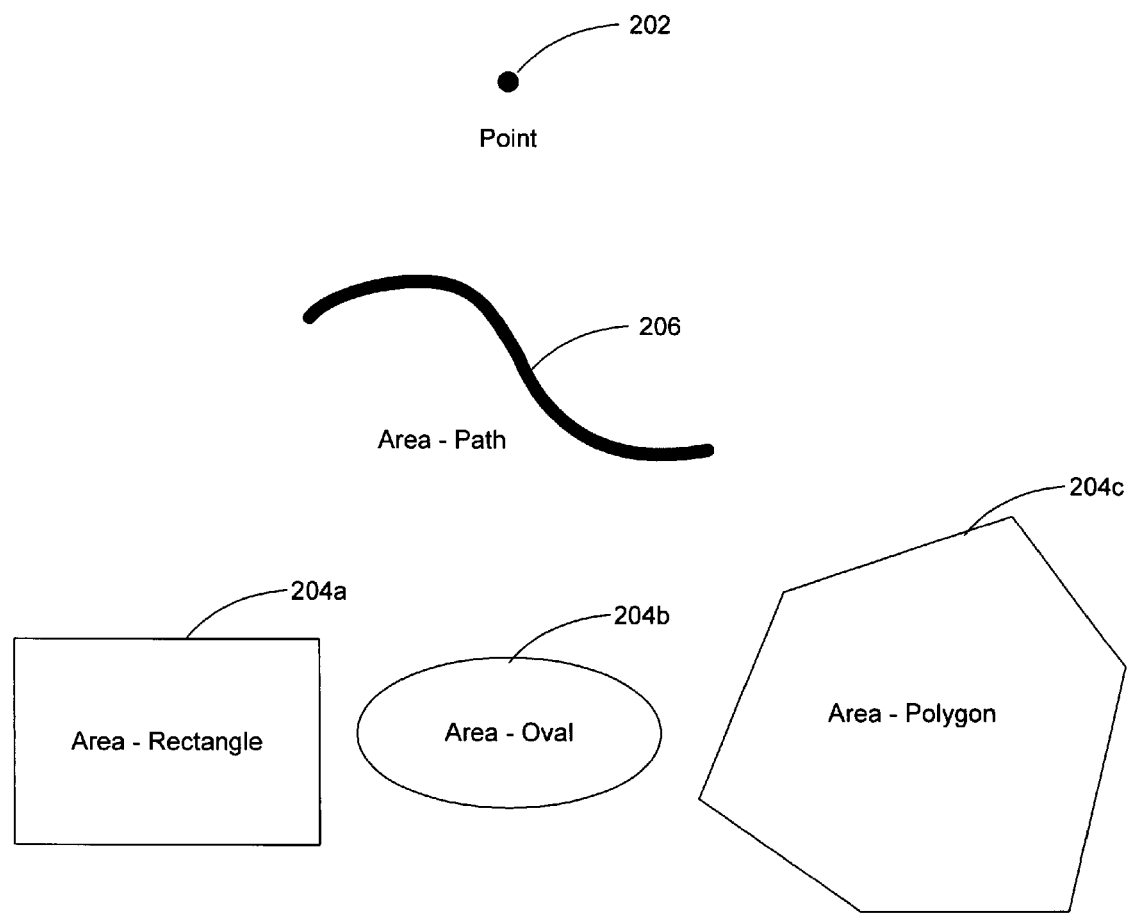
FIG. 2 shows illustrative location descriptors.

Referring to FIG. 2 there is shown illustrative location descriptors, which shows the topological forms that a location attribute of a GLOB can take. The different forms can range from being a single point to some defined area. A location area represents the bound within which the GLOB may exist. There may also be some statistical distribution which can be used to determine the probability of the GLOB existing in a particular point. It is also important to note that the resolution and accuracy of the location can vary widely and is dependent upon the resolution and accuracy of the location information source.

For example if the location was derived from a GPS fix then it will have a high degree of resolution, but if the location was derived from some annotation that simply says "Montana" then it will only have a resolution that corresponds to the state of Montana. Either of these situations maybe modeled using one or the topological forms shown in FIG. 2.

Information that is geocoded may be stored or associated with a particular digital file. For example, many digital recording formats such as JPEG have facilities built into their specification that allow for the addition of location information. Digital formats which do not may require some sort of auxiliary data file that can be stored with the content.

There are a number of ways in which content can be geocoded in order to be turned into a GLOB. The first and most straightforward method is for the device that generates the content to geocode it when the content is generated. This requires that the device have access to location information such as an embedded GPS receiver or perhaps some sort of remote server that can locate the device and transmit its location information to the device. Examples of the latter approach include cell phones which have so called E-911 capabilities.

If the device that generates the content is not able to geocode the content when it is generated then it is necessary to perform some sort of processing step after the content is generated in order to geocode it. Most digital recording devices in use today such as digital cameras have a means to take the content that it generates with the time in which the content was generated. The geocoding step can be automated if another collection of GLOBs exists that were collected at the same time and within the same area as the content that is not geocoded. It is then possible to geocode the content by time correlating with the collection of GLOBs that have already been geocoded. For example, a user could carry around a GPS logger that periodically recorded location and geocode a set of pictures that were taken at the same time.

Another method of geocoding is simply for the user to manually specify the location of the content. This could be done when the content was generated by allowing the use to enter some location data with the content. Examples of this could be text or even voice recordings. Another way the user may specify the location of the content is by displaying maps on a computer screen and allowing the user to simply point and select where the was generated on the map. Additionally, it is not necessary to specify where all the content was generated, but only a select few that provide location landmarks. If the content has a time code that specifies when it was generated then it is possible to interpolate where the content was generated from the landmarks that the user has created. Furthermore, a GLOB may represents a historical event and includes a time code for a future event such as a predictive model of traffic flow where data is generated that represents what is to be expected at a certain location and at a certain time.

In the illustrative embodiment, all content that is geo-located will use an additional data structure referred to as a GLOB Data Sheet (hereinafter "GDS"). The GDS supports two main functions, namely, a data structure that holds auxiliary information about the content such as location, and a data structure that facilitates the searching for content based upon certain attributes such as location.

Figure 3:
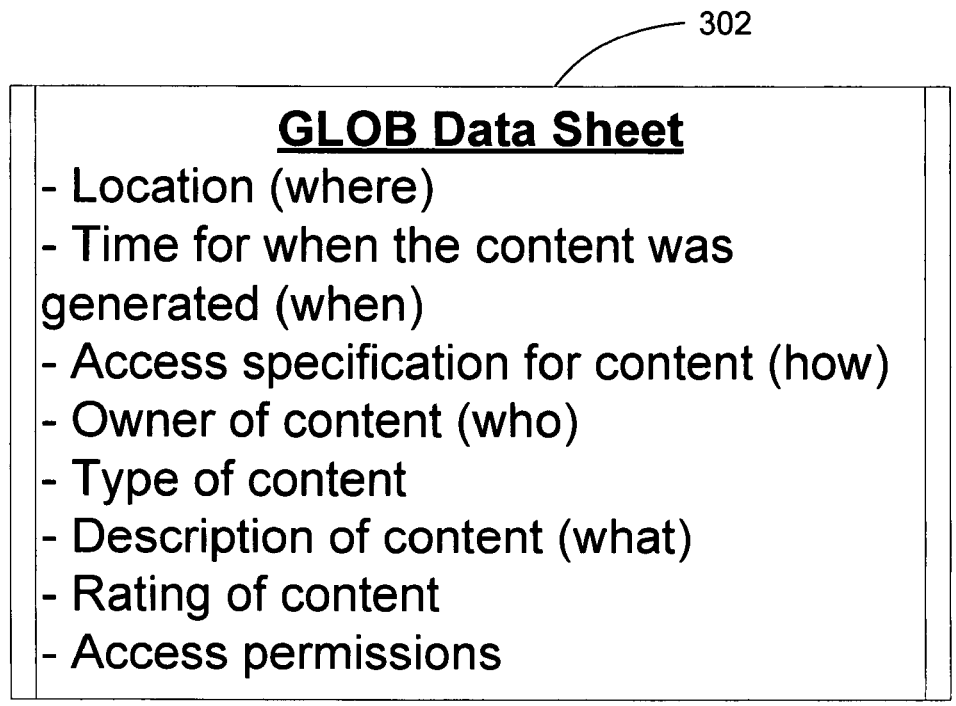
FIG. 3 shows illustrative attributes of a GLOB data sheet.

Referring to FIG. 3 there is shown illustrative attributes of a GDS. The illustrative GDS is a data record that contains the following pieces of information: location, time when the content was generated, owner of content, access specification for content, type of content, description of content, rating of content, and access permissions. By way of example, the location information is provided as longitude and latitude. An illustrative time period associated with the content may also be provided, e.g. time when was a photograph taken. An illustrative data field may also identify who or what is responsible for generating and/or owns the content, e.g. an individual, an organization, or perhaps even a Web site from which the content originates.

Another piece of information that is contained in the GDS may comprise a specification that allows the GLOB content to be accessed, which can be in the form of an identifier that specifies where the content is located as well as a specification that dictates how to access the content from the specified location. Examples of specifications that support this are Uniform Resource Identifiers (URI's) which are well known methods for doing this on the World Wide Web.

Additionally, the GDS may comprise a data record having a description of the type of content, i.e. photograph, video, audio, etc. Furthermore, the GDS may comprise some sort of annotation that describes the content where the illustrative annotation is in the form of text, but can take many forms including audio, video, or images. Further still, the GDS may comprise a rating of the content so that higher rated GLOBs are more likely to be included in Chronicles, Narratives, or Virtual Tours, which are described in further detail below; the rating may be derived from a variety of sources including third parties who have viewed the content.

GDS records are placed into a geo-spatial database and searched according to any of the GDS attributes mentioned above. Thus, it should be possible to create queries such as "give me all the photographs taken by John Smith along a route specified by the coordinates X, Y . . . Z." Such queries would return all the GDS records that satisfy the parameters and the GDS records could be then be used to access the content.

Figure 4:
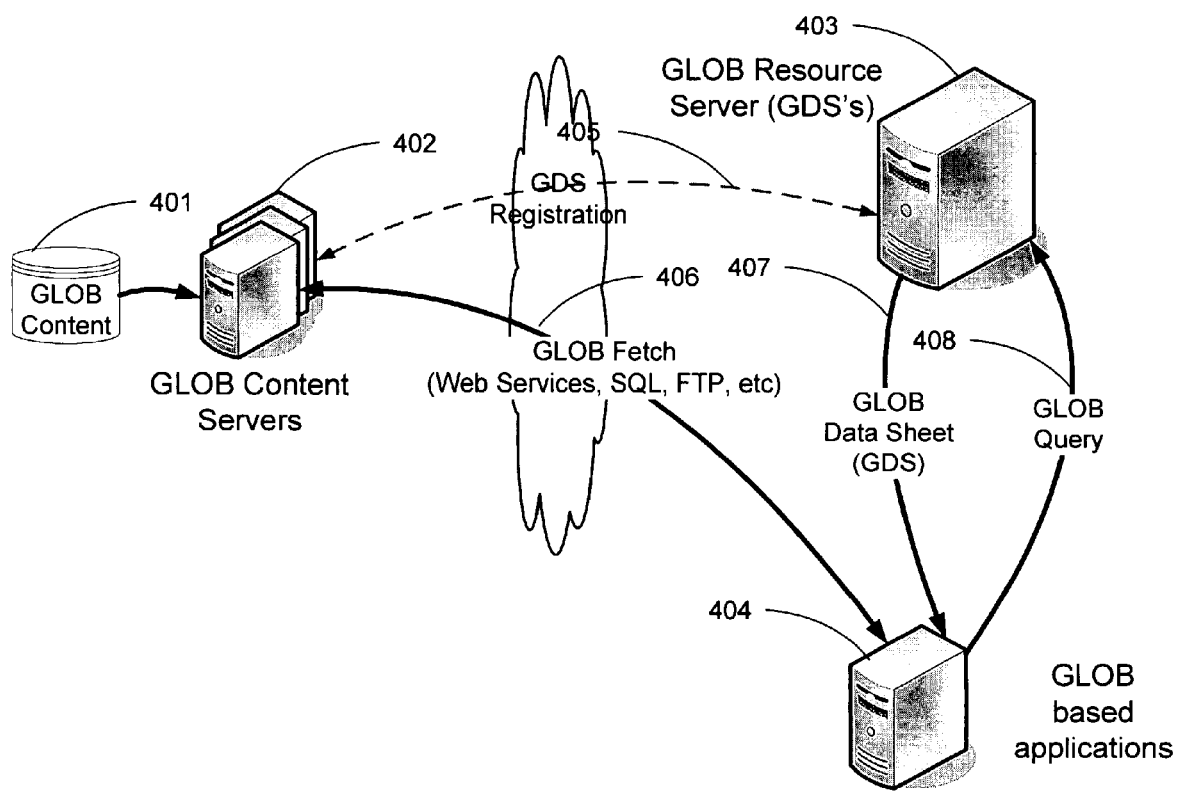
FIG. 4 shows an illustrative system configured to query GLOB data sheets.

Referring to FIG. 4 there is shown an illustrative system configured to query GLOB data sheets. The illustrative GLOB content is stored in some location 401, which may be a database or a file system that is managed by servers 402. Furthermore, the illustrative GLOB data sheets' are stored in servers 403. A GDS may be stored in server 403 via a registration request 405. Application computers 404, which need to locate and use specific GLOB content, proceed to submit a GLOB query 408 to GDS server 403. The GDS server 403 would respond with a set of GLOB data sheets that satisfy the query 407. The application computer 404 may then use the GDS to access the GLOBs 406 from the servers 402 that manage the GLOB content. The accessing of the GLOB content may be performed using a variety of technologies including FTP, SQL, and Web Services, to name a few.

There are many sources of information that can be used to geocode content to create GLOBs and the corresponding GDS that are used to search and access the GLOB content. A "multi-modal" approach to exploit as many sources of location information as possible is described.

As previously discussed, one of the two functions of GDS is for the GDS to control location information. The process of transforming content into a GLOB with a GDS takes advantage of multiple sources of information that determine the content's location. The sources of location information can be categorized as explicit location information, annotations, implicit location information, and association with location logs.

Explicit location information is embedded in the content when it is generated and is easily extracted from the content without any processing or transformation of the information. Thus, the explicit location information is stored with the content when the content is generated. By way of example, the device that generated the content has access to location information such as an embedded GPS receiver. In one illustrative embodiment, a digital camera has an embedded GPS receiver that can be used to store latitude and longitude coordinates in the EXIF header of the images taken and stored by the digital camera.

Another example of explicit location information would include a camera phone with E-911 capabilities that receives location from a remote server. The remote server can track the location of the phone and wirelessly send that information to the camera phone so that it can use it to tag any photographs that it is taking. It could use the location information to store latitude and longitude coordinates in the EXIF header of the images that it generates and saves.

Annotations are added to the content after it is generated and typically require some sort of data entry step that is separate from the actual generation of the content itself. Annotations are created as a separate step, whereas the explicit location information is captured simultaneously with the content. Examples of annotations include text entry and voice recordings. Annotations are typically stored separate from the content, but it may be embedded in the content itself. For example the JPEG image standard allows for some simple annotations to be stored with the JPEG file itself.

Annotations may contain information that can be used to determine the location of the content. Examples are text annotations that contain addresses or simply location key words such as "Eiffel Tower" or "Montana." These location references can be compared to a database of address or location references in order to resolve them to a specific set of geo-spatial coordinates. Databases that contain addresses or well known points of interest that can be used to translate descriptions or references into geo-spatial coordinates are in common use today.

It is also possible to perform voice recognition on audio annotations to extract location key words and then cross reference them to a locations database in much the same way that text annotations are resolved.

In some cases the annotations are only for the purposes of location and are explicitly added for that purpose. For example it is possible to create map and text based tools for the user to type in addresses and display maps that allow the user to point and click on the map to specify where it was located. The locations that are specified by using the map based tools become location specific annotations to the content. The annotations in this case would be a set of coordinates that were added by the user.

Implicit location information is embedded in the content itself and requires some amount of processing to extract. Implicit location information includes information within the content that may be processed to identify where the content was generated. Additionally, any information that can be uniquely matched to something that does have a known location or can be translated into another form such as text can be used to implicitly encode location information by comparing it to a database of known locations.

For example if someone takes a picture of the Eiffel tower it is possible to perform image recognition that identifies the Eiffel tower which by implication means that the picture was taken near the Eiffel tower. Thus if the location of the Eiffel Tower is known then the picture's location is also known. The location of the Eiffel Tower may be part of a database that can be used to resolve well known references or landmarks to a specific set of coordinates.

Another example of this technique is where the user takes pictures of signs in the area that give information such as city and/or street names. It is possible to perform optical character recognition on such images to extract the location information in the form of text. These location references can then be compared to a database of address or location references in order to resolve them to a specific set of geo-spatial coordinates.

A location log is a history of locations that are specific to a person or object. A location log contains a time sequenced series of records with at least the following information: a specification for a location; an identifier for whom or what the location refers to; and a time stamp. Therefore, if there exists a log of locations that specify where some individual as located at particular times, then it is possible to correlate the times that the individual generates content to the locations inside the location log to geocode the content.

In a location log, the specification for a location may comprise a variety of units including latitude/longitude or a description of the location such as an address. In short, the location specification is used to determine where on the earth something is located. The location may have a further qualifier that specifies the accuracy and resolution of the location. For example some records may be derived from GPS locations which have a high degree of resolution and accuracy while other records my be derived from auxiliary documents such as travel itineraries which may only have resolution down to the city, but not where in the city.

The identifier comprises information related to whom or what the location refers to. Typically, this is an individual where the identifier can simply be the individual's name.

The time stamp designates when the above mentioned person or thing was located at the above mentioned location. The time can be specified in a variety of units as long as it can be translated or converted into a date and time. Additionally, the time stamp may have varying degrees of accuracy.

The location log takes of advantage of the capabilities of digital recording devices in use today, e.g. digital cameras, which have a means to tag the content with the time. The geocoding step can be automated if a set of location logs exist that specify where the person that is generating the content is located at times that correlate to the time when the content is being generated. In the illustrative instance where the time the content is generated does not match a record in the location log, it is still possible to estimate the location by extrapolating the location from one or two locations in the location log that are close in time.

As previously mentioned, location logs are stored in a geo-spatial database that supports the querying of entries either by their location or by their time and identifiers. By way of example and not of limitation, there are a variety of technologies and information sources that can be used to generate location log records. For example, cell phones with embedded GPS receivers or that adhere to the E911 directive may be used, and it is possible for enterprise servers to query and log the location of Cell phones. Additionally, location trackers such as GPS loggers that record the latitude/longitude of the person carrying the device, and TV-GPS and/or Wi-Fi location technologies may be used; these location logs can later be uploaded and added to the user's overall location log. Furthermore, the explicit location information embedded in content as described above may be used where the location information can be extracted from content and added to the user's location log. Further still, the implicit location information derived from content as described above can be extracted from content and added to the user's location log. Further yet, content annotations as described above can be converted to locations that can be added to the user's location log.

Other illustrative examples include, but are not limited to, vehicle navigation systems, RFID technology, financial transactions, user schedules, travel itineraries, and Internet Protocol (IP) addresses. Vehicle navigation systems are used to track a vehicle's location and give directions and they use a variety of methods including GPS to track the location of the vehicle; these systems could be used to provide location information that could be loaded into a user's location log. RFID technology such as that used in toll tags in automobiles may also be used. Financial transactions of the user could be mined for information that specifies where the user was located when the transaction occurred. Schedules from a user's calendar or personal information management system can be mined to determine if a location was specified as part of a meeting appointment. Travel itineraries such as those stored on online travel services contain information about where a user was at certain times. Finally, Internet protocol (IP) address location may be used since it is possible to locate where a particular IP address is physically located based upon whom or what organization was assigned that address, so that when a person accesses on line services from some remote location it may be possible to determine where they were when they accessed those services.

The general concepts of a GLOB were introduced above. A discussion of GDS followed that described the two GDS functions, namely, a data structure that holds auxiliary information, and a data structure that facilitates searching. The GDS information comprises one or more sources of location information such as explicit location information, annotations, implicit location information, and location logs.

Now attention is directed to the software modules that collect geocodes and content from multiple sources, and combines the content and geocodes to produce GLOB data sheets. This process may be described as "multi-stage" geocoding and GDS generation.

Figure 5:
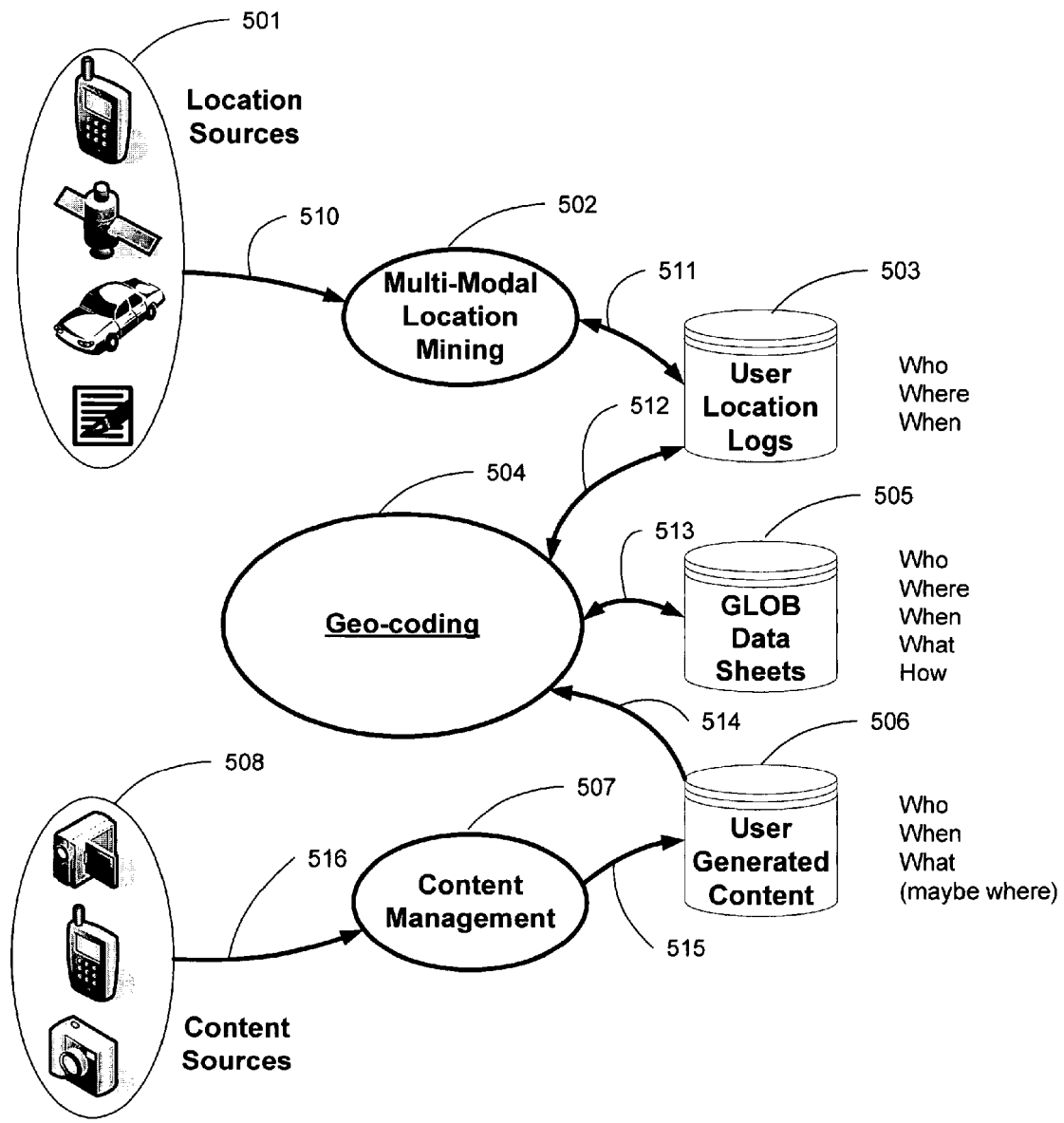
FIG. 5 shows an illustrative diagram of software modules that generate GLOB data sheets.

Referring to FIG. 5 there is shown an illustrative diagram of software modules and processes that generate GLOB data sheets. More particularly, FIG. 5 shows the various functions and modules involved in the process of geocoding content to generate at least one GDS. There exist numerous sources of content 508 including digital cameras. This content is collected and stored within repository 506 and managed using a variety of third party and vendor specific tools 507. The management of the content includes downloading it from the sources and storing 515 the content in some repository 506. In one embodiment, the repository 506 may be local and stored on the user's computer. In another embodiment, the content is uploaded to some third party server on the internet. The repository 506 may be simply a file system on some computer or perhaps a database and access to the repository 506 may be via some server (not shown).

Additionally, there exist a number of sources of user location information 501 such as GPS loggers, Cell phones, and personal information as described above within the context of the location logs. Each of these sources is processed at arrow 510. Additionally, the multi-modal location mining function 502 is performed where the location information that is extracted or mined is stored 511 in a location log repository 503. The repository 503 is a geo-spatial database and typically resides on a network that is publicly accessible. The location log database server is able to handle queries 512 in order to select specific log entries that correspond to specific users and time spans.

The geocoding process 504 uses all available sources of location information in order to create a GDS for each entry in the content repository 506. Each GDS that is created is stored 513 in a GDS repository 505. As previously described, the GDS contains a reference to the content in the content repository 506 as well as location information about where the content is located. The geocoding process 504 uses multiple stages to resolve the content's location as shown in FIG. 6.

Figure 6:
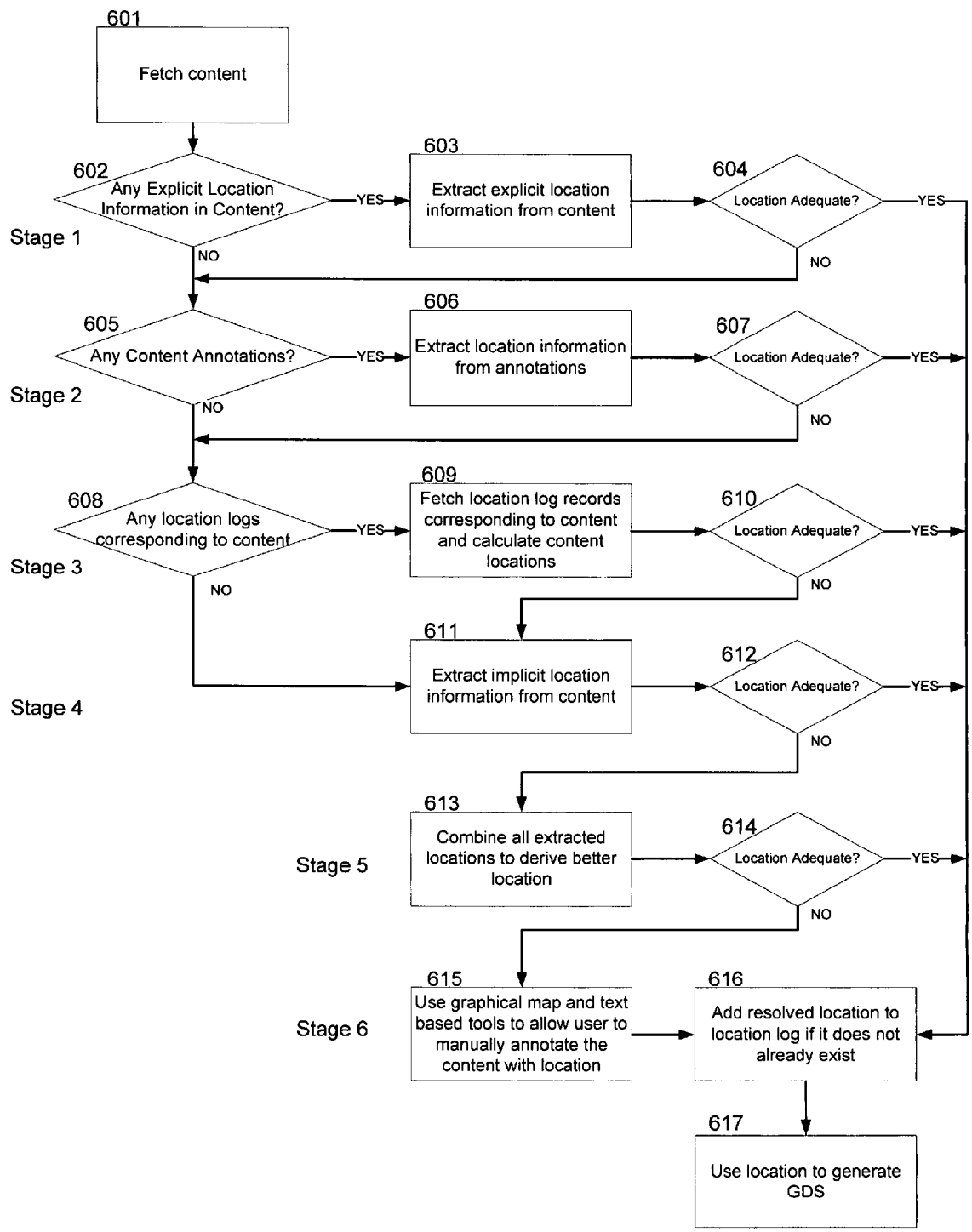
FIG. 6 shows an illustrative flowchart of a geocoding process.

Referring to FIG. 6, there is shown an illustrative geocoding process. The first step, 601, is to fetch some content from the content repository 506. Decision diamond 602 is then executed to determine if there is any explicit location information stored with the content. If YES then process 603 is used to extract the explicit location information from the content. Extracting the location information is dependent upon the type of content and how the location information is stored with the content. A variety of formats and content types can be supported.

Decision diamond 604 is then executed to determine if the location information that was extracted is adequate. Locations are deemed to be inadequate if their resolution and accuracy do not meet certain minimum standards or if there simply is no location record. If decision diamond 604 is YES (i.e. location data is adequate) then it is not necessary to do any more geocode processing to resolve the content's location and process 616 is executed. Process 616 adds location information to the location log 503 if it does not already exist. This is performed so that the location information can be used in the future to geocoding other content. Process 617 is then executed and uses the location information to generate a GDS and add it to the GDS repository 513 and geocoding is complete.

If decision diamond 602 was NO (i.e. no explicit location information in content) or decision diamond 604 is NO (i.e. locations inadequate) then further geocoding needs to take place and decision diamond 605 is executed to see if there are any content annotations. If YES then the annotations are processed by process 606 to extract any location information from the annotations and decision diamond 607 is executed to see if these locations are adequate. Decision diamond 607 is then executed to see if the locations are adequate (analogous to 604 as described above) and if the answer is YES then process blocks 616 and 617 are executed as described above and geocoding is complete.

If decision diamond 605 was NO (i.e. no content annotations) or decision diamond 607 is NO (i.e. locations inadequate) then further geocoding needs to take place and decision diamond 608 is executed to determine if there are any locations in the log that correspond to the content. This decision is based upon the owner of the content and the time period that the content was generated. If there are records in the location log that correspond to the content (i.e. have the same owner and similar time stamps) then the answer to decision diamond 608 is YES and process 609 is executed. Process 609 uses the records from the location logs to calculate locations for the content. This may require extrapolation of the locations from the location log depending upon how closely the time stamp of the content matches the time stamps of the location log records. Decision diamond 610 is then executed to see if the locations are adequate (analogous to 604 as described above) and if the answer is YES then process' 616 and 617 are executed as described above and geocoding is complete.

If decision diamond 608 was NO (i.e. no corresponding records in the location log) or decision diamond 610 is NO (i.e. locations inadequate) then further geocoding needs to take place and process 611 is executed to extract any implicit location information from the content itself. Decision diamond 612 is then executed to see if the locations are adequate (analogous to 604 as described above) and if the answer is YES then process' 616 and 617 are executed as described above and geocoding is complete.

If decision diamond 612 is NO (i.e. locations inadequate) then a further processing step 613 is performed to try and combine all the locations from the previous stages together to see if the location can be further resolved. One example of this step would be to simply take the intersection of all the previous locations as see if it results in a more refined location. Decision diamond 614 is then executed to see if the locations are adequate (analogous to 604 as described above) and if the answer is YES then process' 616 and 617 are executed as described above and geocoding is complete.

If decision diamond 614 is NO (i.e. locations inadequate) then process 615 is executed. Process 615 is a final stage in which various graphical map and text based tools are used to allow the user to specify addresses and point and click on a map to manually specify the contents location. After this step it is assumed that the location has been specified to the level of accuracy and resolution necessary and process' 616 and 617 are executed to generate the GDS and place it in the GDS repository 505 and geocoding is complete.

In summary, the algorithm associated with FIG. 6 describes six distinct location resolution stages: explicit locations in content, i.e. process blocks 602, 603, and 604; content annotations, i.e. process blocks 605, 606, and 607; location log association, i.e. process blocks 608, 609, and 610; implicit location information, i.e. process blocks 611, and 612; combine all previous results, i.e. process blocks 613, and 614; and tools to allow the user to manually annotate the content with location, i.e. process block 615.

It shall be appreciated by those of ordinary skill in the art that the last stage is the only one which is not completely automated and may require the user to perform some manual task, and is only required if none of the previous stages are successful in generating an adequate location. Those skilled in the art shall also appreciate that the algorithm is not dependent upon the order in which stages 1 through 4 are executed. Thus, if it is found that it is more efficient to perform stage 3, i.e. check the location logs, before performing stage 2, i.e. extract location information from the content annotations, then process blocks 610, 611, and 612 may be performed before process blocks 605, 606 and 607. This algorithm is in fact designed so that stages 1-4 can be re-ordered or even omitted to increase efficiency.

Up to this point a description of GLOBs, GLOB Data Sheets (GDS), and the process for geo-coding content to generate at least one GDS has been described. The resulting GDS, which is described above, may be used to organize the GLOB content as shown in FIG. 7.

Figure 7:
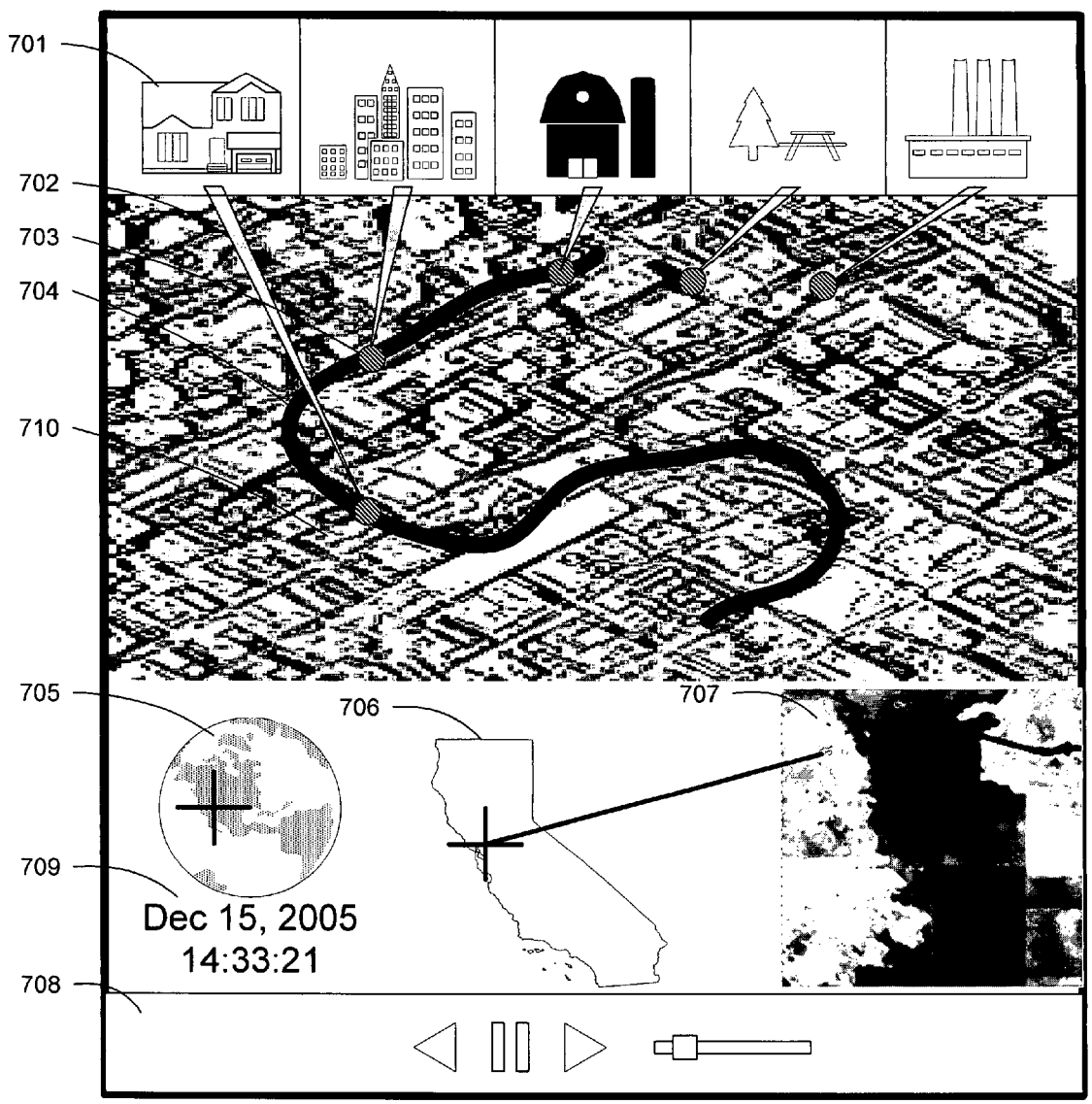
FIG. 7 shows an illustrative example of a Chronicle of GLOBs.

Referring to FIG. 7 there is shown an illustrative example of a "Chronicle" or "Narrative" of GLOBs that are displayed to a user. Note, for purposes of this patent the terms Chronicle and Narrative are used interchangeably. A Chronicle or Narrative is a collection of GLOBs that are organized according to time and location, and may then be animated. The Chronicle is a multi-resolutional depiction of the GLOB data with respect to time and location. The illustrative Chronicle comprises a map display where the time sequenced GLOB content is displayed in order to show the geographic location that the content refers to. A synopsis of the GLOB content as it changes over time can also be shown in the illustrative Chronicle.

The Chronicle has a notion of time that is displayed to the user 709. This notion of time is in relation to the GLOB content that is being animated, i.e. the pictures 701. In the illustrative example, the time being displayed corresponds to the time at which the pictures were taken. The illustrative images or pictures are animated in the form of a slide show that is time sequenced. By way of example, the pictures are being animated by thumbnails that are scrolling smoothly across the screen. For example, there are multiple levels of map display 705, 706, 707 and 710. Each map shows a different level of detail ranging from the entire planet 705 to the local area 710. It shall be appreciated by those of ordinary skill in the art that the multiple levels are not required as long as there is at least one level. It shall also be appreciated that the illustrative maps include maps generated using aerial imagery, or computer generated street maps, or any combination thereof.

The illustrative maps show the location of the images that are currently being displayed in the slide show 701. In the case of the highest resolution map 710, the location of the GLOB pictures are shown by both markers on the map 703 and pointers 702 which point to those markers. This allows the user to easily see where the GLOBs are geographically located.

In addition to the picture GLOB animation there is a route GLOB animation being drawn on the map 704. A route is simply a time sequenced collection of geo-locations and can be animated by drawing the route on the map as the Chronicle's time elapses. Note, the route could represent a route that was taken when the pictures were generated or could represent a route that is to be followed in the future and the pictures represent what is expected to be seen along the way. Therefore, a Chronicle can either represent something that is either currently happening, has happened in the past, or is expected to happen.

The Chronicle may comprise a set of player controls 708 that allow the user to control various aspects of the Chronicle such as playing/pausing, forward/reverse and a method to quickly move to certain time indices of the Chronicle that is similar to a videotape player.

Figure 8:
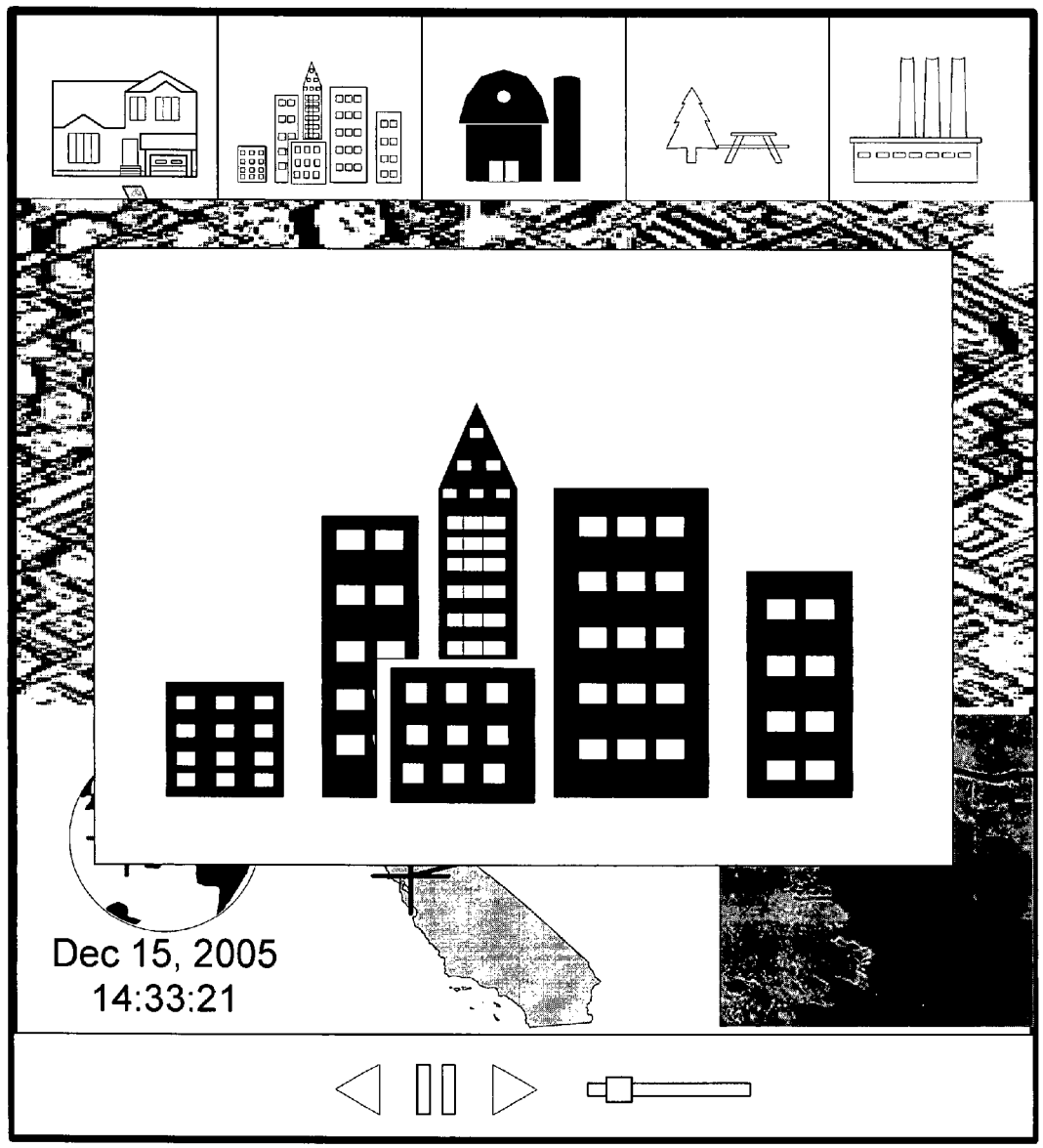
FIG. 8 shows an image with more detail of a particular GLOB.

The illustrative Chronicle may animate a synopsis of GLOB sequences in order to allow the user to quickly and easily view the information represented by the GLOB. Additionally, the user may "drill down" and view more detail associated with a particular GLOB, which may entail getting a more detailed view of a particular picture. The user could do this by simply selecting the thumbnail of the picture and then the Chronicle would pause and a more detailed view of the picture may be displayed. An illustrative example of this is shown in FIG. 8, which displays a more detailed view of the selected GLOB.

The Chronicle is generated using the attributes and features associated with GLOB Data Sheets, which were described above. However, the method for generating Chronicles may require processing third party content and including this third party content in the Chronicle.

Figure 9:
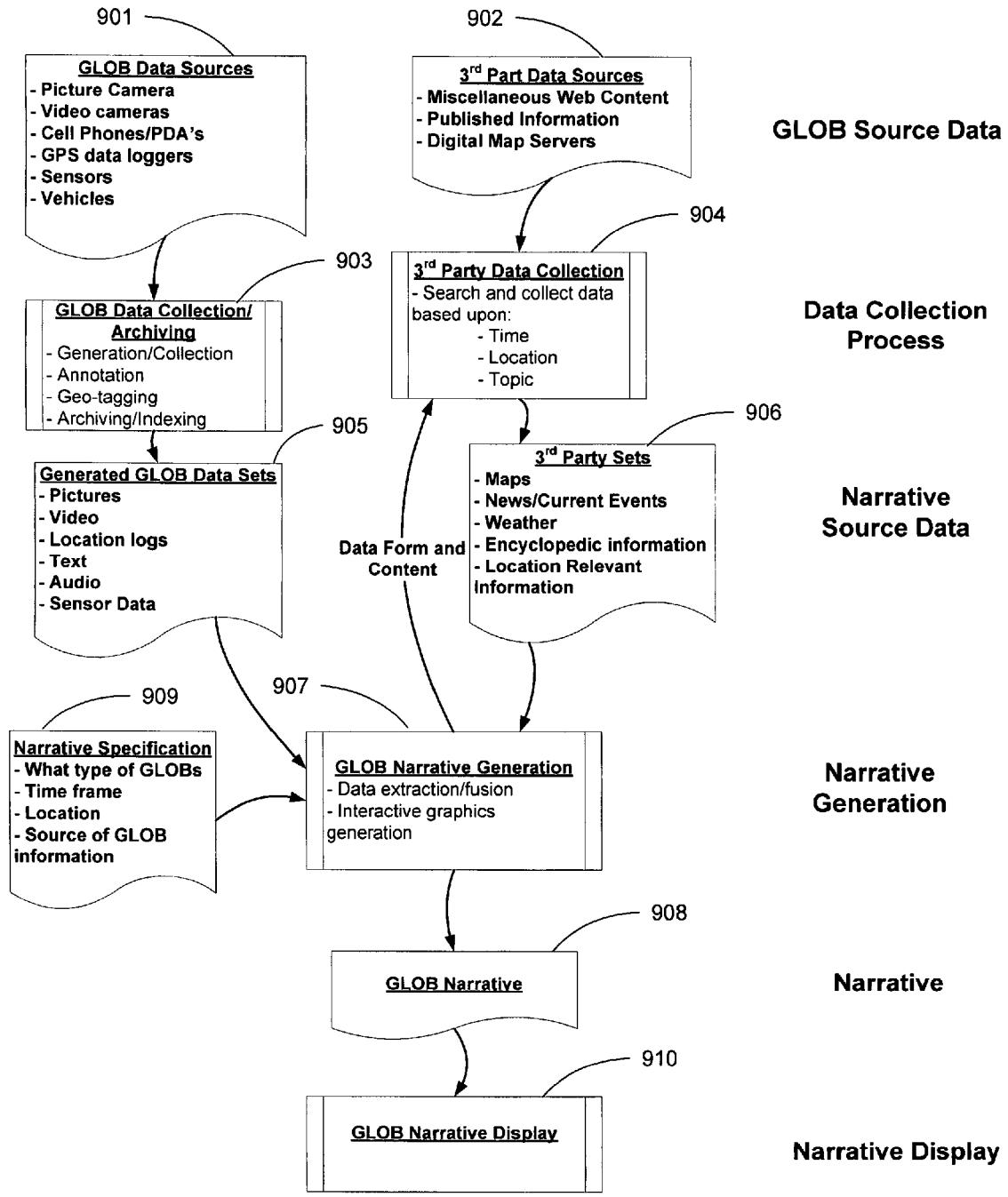
FIG. 9 shows a flowchart for generating an illustrative Chronicle or Narrative that integrates third party information.

Referring to FIG. 9 there is shown the process of generating a Chronicle or Narrative that integrates third party information. The process for generating a Chronicle involves combining GLOB data that has been generated with maps and other third party content. Initially there exist a set of data content that is generated for the purpose of using as a GLOB 901. Note, when the data is generated it may or may not be geocoded. There also exists various third party content such as Maps, documents, etc., which may be used in conjunction with the generated GLOB data to create a Chronicle.

The first process step 903 is for the generated date to be collected and turned into GLOBs by adding geo-location information if necessary. Process step 903 may also entail annotating the GLOBs with additional information such as textual description of the content of the GLOB. Finally the information is indexed and archived in some fashion so that it may be retrieved later. This may entail the use of well known database technologies. The result of this is a set of GLOB data sets 905 that can bused for the Chronicle generation.

The actual Chronicle generation process 907 entails using a Chronicle specification 909 to collect all the data, namely, both GLOBs 905 and third party date 906. The Chronicle specification may comprise the type of GLOB data desired, the location, the time frame, and source of the GLOB data. The collection of the third party data may interface with various map servers and other databases and possibly Internet based information servers 904 to collect all the information that is relevant to each GLOB and its associated content 906. The information that is retrieved is dependent upon the specification of the Chronicle. Note, a Chronicle specification may refer to the past, present or future time frames.

Once the data sets 905 and 906 have been collected, a graphical representation is generated where the GLOB data is animated in time and shown geographically, as described above. The manner in which the Chronicle is generated and displayed is discussed in more detail below.

Note, the Chronicle or Narrative specifications 909 can specify various types of information such as the following: show traffic and roadside images for a specific route taken at a specific time; show a photographic travel log of a trip; shows the states of various sensors located in a particular region; show additional third party information such as weather; or any combination thereof.

Once a Chronicle is generated it may be stored in a variety of formats including the following: source GLOB data and Chronicle specifications that allows the Chronicle either be regenerated or viewed; video files on servers or computers that can be played in a variety of ways; video files on local store media such as DVD's, hard disks, flash memory, or other such storage media.

Additionally, Chronicles can be stored with only synopsis information, e.g. skinny Chronicle as described blow, where the detailed GLOB information is stored separately and accessed on an as needed basis. Chronicles which have been generated can be viewed in a number of different ways including the following: using a computer like PC or possible even a mobile device that runs a special Chronicle viewer application and uses the specification and GLOB information in the Chronicle to generate and display it; using any sort of digital video capable device such as computer or mobile device that can play video files that are stored either locally or remotely on the computer; using a television and DVD player where there is an interactive video of the Chronicle stored on some type of local media such as DVD or video recorder; using a network, e.g. Internet, capable device that is capable of receiving and displaying streaming video. Illustrative examples of such devices include, but are not limited to, desktop computers, mobile PDAs, navigation devices, cell phones, cable television, and similar network capable devices.

Figure 10:
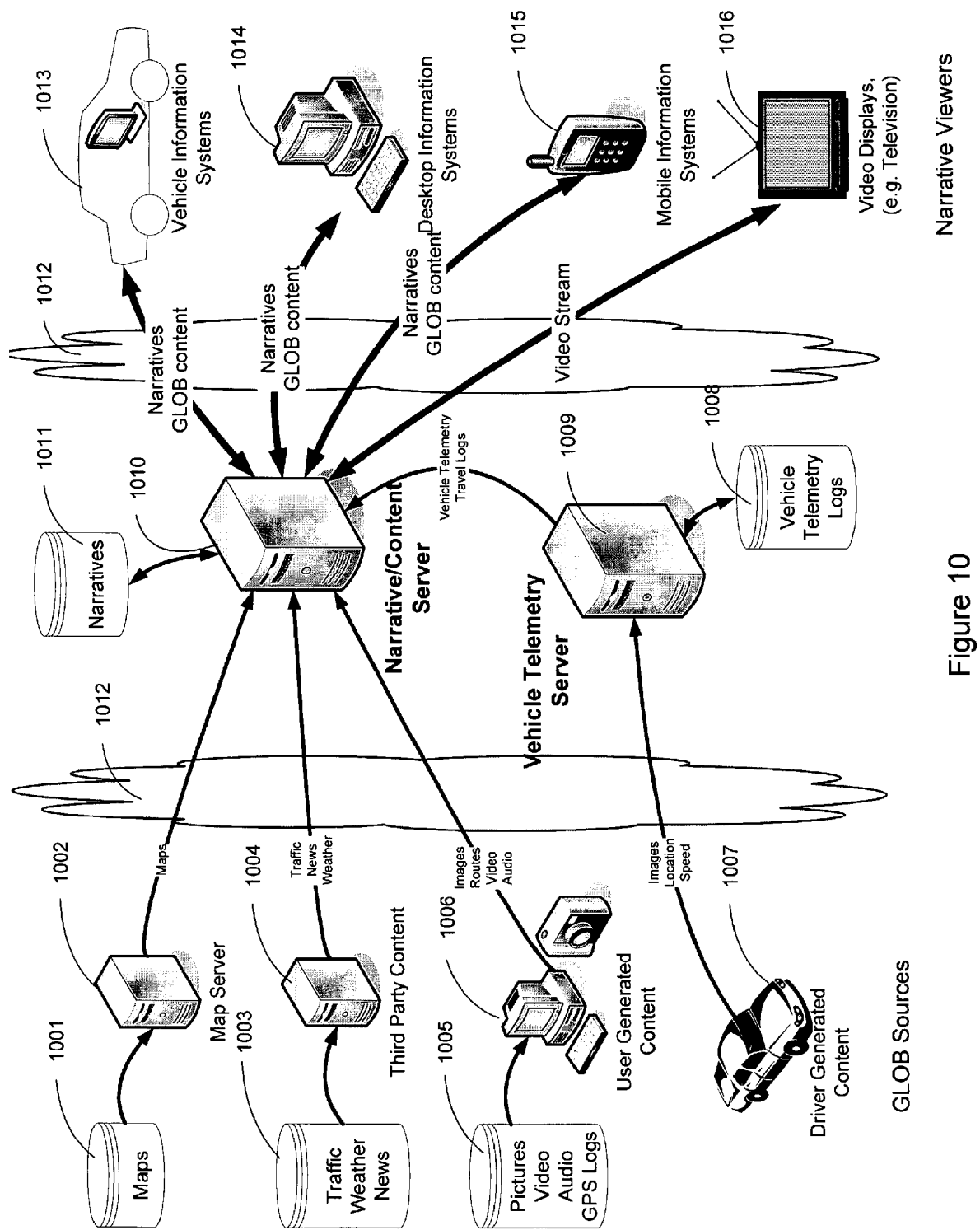
FIG. 10 shows illustrative system architecture for generating a Chronicle or Narrative.

Referring to FIG. 10 there is shown a general overall architecture for Chronicle generation. As shown in FIG. 10, the generation of Chronicles requires gathering GLOB information from various sources 1001, 1003, 1005, and 1007 that are served up from a variety of servers 1002, 1004, and 1006 that may be distributed and interfaced via some sort of wide area network 1012 such as the Internet and the World Wide Web. The vehicle telemetry server 1009 is an example of a server that continuously collects data from a potentially large number of sources (vehicle probes 1007) and stores the information in a database 1008. It shall be appreciated by those skilled in the art that servers such as 1008 and 1009 do not necessarily apply only to vehicles, but could apply to any data sources which may be numerous and continuously generate information such as sensors that are part of some large sensor network.

Chronicles or Narrative may be viewed by a number of different devices 1013, 1014, 1015, 1016. These devices may be normal desktop systems 1014, mobile devices 1615 such as PDA's or cell phones, special embedded systems such as navigation or vehicle information systems inside vehicles 1013 or even video display systems such as televisions 1016. Like the GLOB sources, these devices are network via some sort of WAN 1012 that includes such systems as cable television.

FIG. 10 also shows a server 1010 which aggregates information from the various GLOB sources and both generates the Chronicle and serves them to the devices used to view the Chronicles. Typically, the Chronicle server 1010 will store the generated Chronicles in a database 1011.

Referring to FIG. 11-15, there is shown a plurality of different system configurations for the various servers, GLOB sources, and Chronicle viewing devices that are depicted in FIG. 10. These system configurations are provided as illustrative examples and those skilled in the art shall appreciate that there may be different combinations that perform the same of similar functions.

Figure 11:
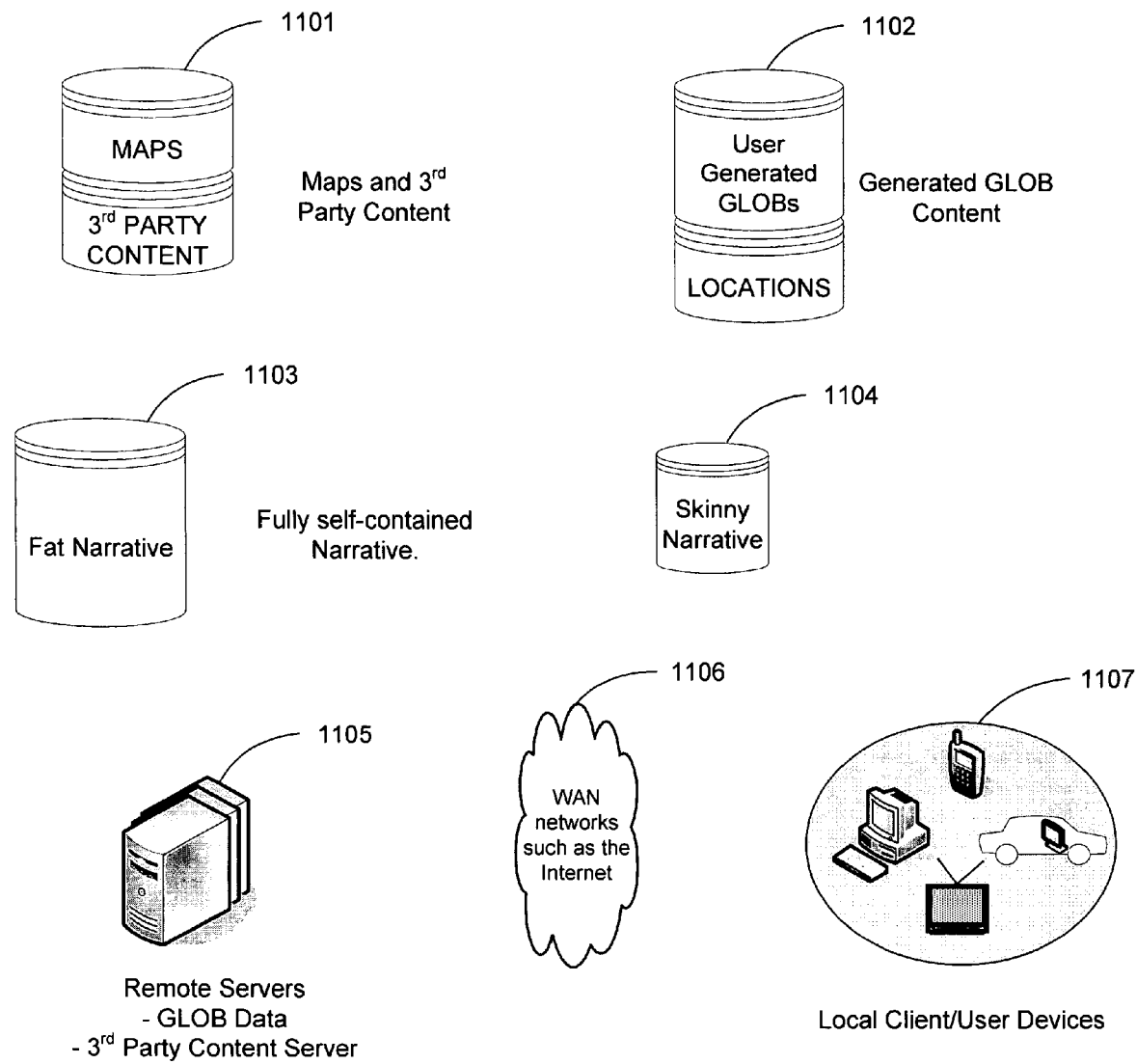
FIG. 11 shows the various components of the Chronicle or Narrative presentation systems.

Referring to FIG. 11 there is shown the various components of the Chronicle or Narrative presentation systems. More particularly, FIG. 11 shows the various components that are used to describe the various scenarios. There exist third party content datasets 1101 that contain GLOB information such as maps and other readily available information such as traffic reports, weather, news, and other such information that may come from various third party vendors or sources. This information may be stored in traditional databases or simple files and made available through standard interfaces such as web services.

There also exist user generated GLOB content and potentially location logs 1102. This data may also be stored either in files or in a database of some sort.

There exist a variety of user devices 1107 which represent the various platforms that the end user will use to view the generated Chronicles. In some scenarios, these same devices may also store the GLOB content and generate the Chronicles.

There also exist a number of remote servers 1105 that are used to either serve up GLOB content or generate and serve Chronicles.

There exist so called "Fat Chronicles" 1103 that provide fully self-contained Chronicles in which all the GLOB content of the Chronicle is stored with the Chronicle. Fat chronicles do not require additional information, but are very large and thus more difficult to move around over WAN's.

There also exist so called "Skinny Chronicles" 1104 that contain only enough content for the previewing of the GLOB data, but not the detailed GLOB information. Skinny Chronicles are much smaller and easier to move around, but require that detailed content be served up on an as needed basis.

FIGS. 12-15 describe a number of system architectures that may be used to manage the GLOB content and generate the Chronicles. Each of these scenarios may be used depending on system design and limitations. The main differences between the various scenarios revolve around the following design parameters: how much GLOB content is managed and stored locally versus remotely; and how much of Chronicle is generated locally versus remotely.

Referring to FIG. 12 there is shown an illustrative Chronicle architecture with fat servers and thin clients. In this architecture all the GLOB content is managed remotely. This may entail users to transfer any GLOB content that they have generated to the remote servers. Additionally, the Chronicles are generated by remote servers and served up to the user's computers. The Chronicles may be served up as simple web based application or there may exist as a custom application on the user's computers that allow the Chronicle to be viewed. In FIG. 12, the Chronicles are accessible from anywhere and thus easier to share among various users. Additionally, the Chronicle may be served up as a web application thus the user utilizes a browser based interface, thus no custom program is needed to view the Chronicles.

Referring to FIG. 13 there is shown an illustrative Chronicle architecture with no remote servers. In FIG. 13 all the GLOB content and Chronicles are generated and managed locally on the users computers so that everything is self-contained and so there is no Wide Area Network (WAN) required and no remote servers are required.

Referring to FIG. 14 there is shown an illustrative Chronicle architecture with remote servers having generated skinny chronicles. In FIG. 14, the remote server serves up skinny Chronicles while the locally generated GLOB content is stored and managed on the user's local computer, and there is less of a burden to upload all locally generated GLOB content. All that needs to be uploaded are the GLOB synopsis. There is less storage required on the remote servers.

Referring to FIG. 15 there is shown an illustrative chronicle architecture where the server serves remote content and clients generate the chronicle. In FIG. 15, the remote servers serve up remote GLOB content and user's computers manage locally generated GLOB content and generate the Chronicles. This scenario does not require transferring all locally generated GLOB content to a remote server, and there is less storage required on the remote servers.

Up to this point, a description of GLOBs and GLOB Data Sheets has been provided. Additionally, attention has been directed to the software modules that collect geocodes and content from multiple sources, and combines the content and geocodes to produce GLOB Data Sheets (GDS), which may be described as "multi-stage" geocoding and GDS generation. Subsequently, an illustrative example of a "Chronicle" or "Narrative" of GLOBs that are displayed to a user was discussed. Furthermore, an illustrative process for generating a Chronicle or Narrative, which integrates third party information, was also described. A plurality of different system architecture for Chronicle generation was also presented.

Since there are many sources of information that can be used to geocode content to create GLOBs, a method for implicitly calculating location based on limited explicit location information is described below. This method is also referred to as geocoding groups of sequenced object wherein location information is used, regardless of its source, to geocode groups of sequenced objects. The method requires that there exist enough location information to individually geocode each object in the group and does not rely on the fact that the objects in the group are sequenced. In operation, the method describes explicitly geocoding a subset of the objects in a group and then implicitly calculating the locations of the other related objects in the group by exploiting their relationship to the explicit location information for one or more GLOBs.

In one illustrative embodiment, the first and simplest way to geo-locate a group of related objects is to group them all together and assign the same geocode to them all. Therefore, when one of the objects is geo-located all the objects can be assigned the same geocode. For example, there may be a collection of photographs that all have the same annotation of "May field trip" and are thus related in this fashion. If any of the photographs in that collection can be geo-located, then by using the associated annotation of "May field trip" all the photographs can be located in the same place. Although this may be adequate for many applications, it does not allow for the differentiation by location of the individual objects in the group.

Additionally, when the objects in the group are sequenced it is possible to exploit their sequential relationship to extrapolate their locations when one or more objects in the group are explicitly located.

For example, in FIG. 16 there is shown a group of related objects such as photographs 2301, 2302, 2303, 2304, and 1205 that have specific time stamps. As shown in FIG. 16, it is possible to order the pictures into a sequence based upon their time stamps. In FIG. 16, they are ordered from left to right according to their time stamps as indicated. FIG. 17 shows the display of an example graphical based tool that some user can use to geocode the photographs from FIG. 16. Such a tool is a computer program that could be a stand alone program or a web based application that runs within an internet browser. It contains a map display 2406 that the user can use to explicitly geocode photographs. An example of how this could be done would be for the user to select a photograph and then click on the map where the photograph is located. Another illustrative method would be to enter a textual address which gets resolved to a location on the map. These are just two examples of how to explicitly geocode a photograph, but in fact any of the location sources mentioned above may be used for this purpose.

FIG. 17 shows the location on the map where photographs 2301 and 2305 were explicitly located as described above, and this is depicted by locations 2401 and 2405, respectively. Between points 2401 and 2405 there exists an implicit linear path 2407 that can be used to implicitly geocode the remaining photographs 2302, 2303, and 2304. Assuming the remaining photographs lie somewhere on this path we can use the time stamps of the photographs and their relationships to the explicitly located photographs to determine their location on the path 2407. FIG. 17 shows implicit locations 2402, 2403, and 2404 that lie on path 2407 and whose relative locations are a linear interpolation along the path based upon time. For example, implicit location 2403 lies on the mid point of path 2407 because the time stamp of photograph 2303 is midway between the time stamp of 2301 and 2305 which form the endpoints of path 2407.

To further illustrate this process, FIG. 18 shows a case where photographs 2301, 2303, and 2305 have been explicitly located to locations 2401, 2503, and 2405, respectively. In this instance, there are two paths generated. There exists path 2506 between 2401 and 2503 and path 2507 between 2503 and 2405. In FIG. 18, location 2502 is implicitly calculated as a linear interpolation based upon time along path 2506 and likewise location 2504 is implicitly calculated as a linear interpolation along path 2507 based upon time.

In general, sorting the list of related objects according to time then each successive pair of explicitly located objects in the list determine a path along which the other objects may be implicitly located by extrapolating their locations along the paths formed by the two objects that are greater than and less than they are according to time.

The examples above used a linear path between successive explicitly located objects, but it is possible to use other types of paths and extrapolate along them. For example, if the actual path taken by the person generating the content (i.e. taking the pictures) is known it is possible to extrapolate along that path instead of using a linear path. For example, it might be known that the person taking the pictures took a certain route through a street network in which case that route should be used to extrapolate the implicit locations. Such a route might be defined by a sorted list of line segments.

Furthermore the examples above did a linear interpolation along the path based upon time, but it is possible to use alternative distributions and/or rules that are not linear. For example, it is possible to use a rule wherein all pictures that are taken within 10 minutes of an explicitly located photograph are assumed to be in the same location.

FIG. 19 shows examples of using non-linear paths and non-linear time interpolation along those paths. In FIG. 6 photographs 2301 and 2305 have been explicitly located at locations 2601 and 2605. In addition, it is known that during this time the person traveled along route 2606. Furthermore the implicit locations 2602, 2603, and 2604 are extrapolated along path 2607 using the rule that all photographs taken within 10 minutes of an explicitly located photograph are assumed to be in the same location as the explicitly located photographs.

It is important to note that the general method described above relies on the fact that the objects are sequenced and not upon the fact that they have time stamps. In the examples above the time stamps of the objects were used to create the sequence and to also extrapolate locations along paths, but it is possible to perform similar operations even if the objects did not contain time stamps. For example, it is possible for a user to create a sequence of pictures that are based upon personal choice and not upon any time stamps that the picture has. In this case it is still possible to explicitly locate a subset of the pictures and implicitly generate locations for the other objects.

FIG. 20 shows an example of geocoding pictures that do not have time stamps, but are still part of a user defined sequence. In the illustrative example of FIG. 20, the pictures are related by the sequence, but they do not have any additional information (such as time) that allows the location to be extrapolated other than by distance along the path. Thus the implicitly located photographs 2702, 2703, and 2704 are evenly spread between the explicitly located photographs 2701 and 2705 based upon their distance along the path 2707 from 2701 to 2705.

If there does exist additional information that allows the photographs to be further related then it is possible to use this information to further refine their location extrapolation. FIG. 21 provides an illustrative example where the user has specified that photographs 2801, 2802, and 2803 were taken in the same place. In FIG. 21, photographs 2801 and 2805 are explicitly located and photographs 2802, 2803, and 2804 are implicitly located along path 2807. Since photographs 2802 and 2803 were related to 2801 to be in the same place they are located in the same place as 2801. Since 2804 does not contain any additional relation information it is located midway between 2801 and 2805 along the path 2807.

It shall be appreciated by those of ordinary skill in the art having the benefit of this disclosure that a number of different paths and extrapolations rules and/or equations could be used to generate implicit locations. It shall also be appreciated by those of ordinary skill in the art that the process of explicitly geocoding some subset of the photographs could use any of the sources of location information described above and that in principle the implicit geocoding process would still be the same. Thus as long as there is some means to explicitly geocode some subset of related objects the remainder of the objects can be implicitly geocoded by generating paths between the explicitly geocoded objects and extrapolating locations along those paths based upon time.

In the illustrative example of a Chronicle or Narrative having a plurality of GLOBs that are displayed to a user, which is described above, the process of data collection and animation is not automated. An animated system and method for viewing a Chronicle, which is referred to as a "Virtual Tour", is described below.

A "Virtual Tour" is a visual and/or audio presentation of what one might experience if they were to visit some location. This presentation is typically rendered on some sort of electronic display or screen that is connected to a computing device such as a desktop or handheld computer.

Referring to FIG. 22 there is shown an illustrative Virtual Tour. The Virtual Tour shows one or more maps at various levels of scale 3105, 3106, 3107, and 3110 that clearly show to the user the geographic location of the tour. Although multiple scale levels are shown, only one scale level is required. The maps may be from aerial imagery, computer generated street maps, or any combination thereof.

The Virtual Tour contains images in the form of pictures and/or videos that show what the user might see and/or hear if they were to actually go to the locations indicated in the map. The images are being animated in the form of a slide show that is time sequenced. The pictures are being animated by thumbnails that are scrolling smoothly across the screen.

The maps show the location of the images that are currently being displayed in the slide show 3101. In the case of the highest resolution map 3110 the location of the images are shown by both markers on the map 3103 and pointers 3102, which point to those markers. This allows the user to easily see where the images are geographically located and what they might expect to see if they were at those locations.

In addition to the image animations there may be a route being drawn on the map 3104. A route is simply a time sequenced collection of geo-locations and can be animated by drawing the route on the map as the images scroll by (i.e. time elapses). It is important to note that the route could represent a specific tour and correspond to the sequence of images being shown.

The Virtual Tour may have a notion of time that is displayed to the user 3109. This notion of time is in relation to the content that is being animated, i.e. the images 3101. In this example the time being displayed corresponds to the time at which a proposed tour may be taken.

The virtual tour may contain a set of player controls 3108 that allow the user to control various aspects of the tour presentation such as playing/pausing, forward/reverse and a method to quickly move to certain time indices of the Virtual Tour. This is much like one might find on a Video player. In addition there may be keys or controls which allow the user to pan and zoom the various maps.

The Virtual Tour may contain icons or images superimposed on the map 3111 and 3112, which represent "Points of Interest" (POI). These points of interest may be businesses such as hotels and gas stations or they may be places which have some attraction such as a museum or a tennis club. Businesses such as hotels or restaurants may be sponsored by the business establishment and any images or information may be provided by the business itself. This might even include promotional items such as discounts or coupons.

As shown in FIG. 23, if the user selects one of the POI icons it may bring up additional information or even another Virtual Tour that is associated with the business or location represented by the icon.

Virtual Tours animate a synopsis of image sequences in order to allow the user to quickly and easily view the images and their locations. If the user so desired they could "drill down" and view more detail associated with a particular image or location. In the illustrative example provided in FIG. 22 this might entail getting a more detailed view of a picture. The user could do this by simply selecting the thumbnail of the picture and then the Virtual Tour would pause and a more detailed view of the picture displayed, as shown in FIG. 24.

The illustrative Virtual Tour is generated automatically by a remotely located Virtual Tour Server in response to a user specifying the type of tour they are interested in seeing.

FIG. 25 shows a Virtual Tour Server 3404 that creates a Virtual Tour that can be viewed on a variety of user viewing devices 3405 including mobile devices, desktop computers, video monitors (TV's), and in-vehicle systems such as navigation systems. The Virtual Tour Server 3404 is accessed by the user via some sort of wide area network such as the Internet 3403. The user specifies the type of Virtual Tour they want to view by indicating one or more factors that they are interested in such as: location of the tour such as a city or country; route to be taken; type of activities desired such as surfing, and other well-known activities; type of attractions, e.g. museums; specific events; date and time of the tour; and new tour based upon previous Virtual Tour.

A Virtual Tour is generated by the Virtual Tour Server by bringing together and displaying GLOBs such as images, maps and POI data 3401 from a variety of sources. This GLOB content is accessed via GLOB servers 3402 that are accessible via a wide area network 3403 such as the internet. The Virtual Tour Server combines all the GLOB content together and presents it to the user in a manner as described previously.

FIG. 26 shows is a more detailed depiction of the full architecture where there exists a Virtual Tour Server that generates the Virtual Tours. Users access the Virtual Tour Server from a variety of devices such as vehicle information systems 3813, desktop computers 3814, mobile devices 3815, and streaming video displays 3816. The Virtual Tour Server may be accessed over a variety of public networks 3812 such as the Internet.

Upon receiving a request from a user for a Virtual Tour the Virtual Tour Server collects a variety of GLOB content from various sources and dynamically generates the Virtual Tour. As previously discussed there exists a variety of GLOB content such as maps 3801, third party content 3803, user generated content 3805, and POI data and advertisements 3817. This content is managed by a variety of servers 3802, 3804, 3806, and 3807 and accessed via a network 3812. The Virtual Tour Server 3810 locates the GLOB content by submitting requests to the GLOB Resource Server 3809 and 3808. Upon getting a collection of GLOB Data Sheets from the GLOB Resource Server, the Virtual Tour Server accesses the GLOB content and uses it to produce a Virtual Tour. The Virtual Tour is then served up to the user that made the request for the Virtual Tour.

It is important to note that in some case it may not be necessary to dynamically generate a Virtual Tour if one satisfying the request has previously been generated and is stored in a Virtual Tour database 3811. In this case the Virtual Tour Server need only access and serve up the Virtual Tour without generating it. Such pre-produced Virtual Tours may exist as the result of users generating and storing their own Virtual Tours or perhaps as the result of a business related to a POI generating one to help promote their business. For example, a hotel may produce a Virtual Tour that can be shown to potential customers that are interested in staying at their hotel.

It is to be understood that the foregoing is a detailed description of illustrative embodiments. The scope of the claims is not limited to these specific embodiments. Various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for geocoding a plurality of objects, the system comprising:
    a content repository storing the plurality of objects;
    a location log storing a plurality of location information;
    a geocoding module configured to identify an explicitly located object among the plurality of objects, said geocoding module configured to store a location of the explicitly located object in the location log;
    the geocoding module configured to identify one or more objects without location information, the geocoding module configured to determine a relationship between the one or more objects without location information and one or more records in the location log;
    the geocoding module configured to calculate locations for the one or more objects without location information based on the relationship, resulting in one or more objects with derived locations;
    the geocoding module configured to generate a plurality of geo-located object data sheets (GDSs), wherein each GDS associates an object with a location from the location log; and
    a GDS repository configured to store the plurality of GDSs, wherein each GDS includes a particular location, a particular time corresponding to when the object was generated, and a particular description of the object.

2. The system of claim 1, said geocoding module further configured to identify an annotated object among the plurality of objects, said annotated object including a content annotation specifying a location, said geocoding module configured to store the location of the annotated object in the location log.

3. The system of claim 2, wherein the content annotation includes geo-spatial coordinates.

4. The system of claim 2, wherein the content annotation includes one or more keywords.

5. The system of claim 1, wherein the relationship includes the one or more objects without location information having a same owner as the one or more records.

6. The system of claim 1, wherein the relationship includes the one or more objects without location information having a similar time stamp as the one or more records.

7. The system of claim 1, wherein the geocoding module is further configured to generate a geo-located object data sheet for the explicitly located object, and to generate one or more geo-located object data sheets for the one or more objects with derived locations.

8. The system of claim 1, wherein the plurality of objects includes at least one of a picture, a video, an audio, a sensor measurement, a map, a document, a recorded location log, an automotive telemetry, a weather report, and a news item.

9. The system as recited in claim 1, further comprising an input system enabling a user to specify the location of one or more other objects without location information among the plurality of objects.

10. A system for geocoding a plurality of objects, comprising:
    a processor; and
    a non-transitory computer readable medium encoded with processor readable instructions that when executed by the processor implement:
        receiving an object among the plurality of objects;
        determining if an explicit location is associated with the object;
        storing the explicit location on a location log if the object includes the explicit location, the location log including a plurality of location information;
        if the object does not include the explicit location, determining if the object includes a content annotation with location information;
        storing the location information from the content annotation on the location log if the object includes the content annotation;
        if the object does not include the explicit location or does not include the content annotation, determining if one or more locations in the location log correspond to the object and calculating the location of the object from the one or more locations in the location log;
        generating a plurality of geo-located object data sheets (GDSs), wherein each GDS associates an object with a location from the location log; and
        storing the plurality of GDSs in a GDS repository, wherein each GDS includes a particular location, a particular time corresponding to when the object was generated, and a particular description of the object.

11. The system of claim 10, wherein the content annotation includes geo-spatial coordinates.

12. The system of claim 10, wherein the content annotation includes one or more keywords.

13. The system of claim 10, wherein determining if the one or more locations correspond to the object include determining if the object has a same owner as the one or more locations.

14. The system of claim 10, wherein determining if the one or more locations correspond to the object include determining if the object has a similar time stamp as the one or more locations.

15. The system of claim 10, wherein the instructions further comprise generating a geo-located object data sheet for the object.

16. The system of claim 10, wherein the plurality of objects includes at least one of a picture, a video, an audio, a sensor measurement, a map, a document, a recorded location log, an automotive telemetry, a weather report, and a news item.

17. The system of claim 10, further comprising an input system enabling a user to specify the location of the object.

18. The system of claim 10, wherein the instructions further comprise determining if the object includes the content annotation if the explicit location is not adequate, and calculating the location of the object from the one or more locations in the location log if the content annotation is not adequate.

19. A method for geocoding a plurality of objects, comprising the steps of:
receiving the plurality of objects, wherein each object comprises a plurality of digital information;
identifying an explicitly located object among the plurality of objects, said explicitly located object including a location;
storing the location of the explicitly located object on a location log, the location log including a plurality of location information;
identifying one or more objects without location information among the plurality of objects;
determining a relationship between the one or more objects without location information and one or more records in the location log;
calculating locations for the one or more objects without location information based on the relationship, resulting in one or more objects with derived locations;
generating a plurality of geo-located object data sheets (GDSs), wherein each GDS associates an object with a location from the location log; and
storing the plurality of GDSs in a GDS repository, wherein each GDS includes a particular location, a particular time corresponding to when the object was generated, and a particular description of the object.

20. The method of claim 19, further comprising the steps of:
identifying an annotated object among the plurality of objects, said annotated object including a content annotation specifying a location; and
storing the location of the annotated object in the location log.

21. The method of claim 20, wherein the content annotation includes geo-spatial coordinates.

22. The method of claim 20, wherein the content annotation includes one or more keywords.

23. The method of claim 19, wherein the relationship includes the one or more objects without location information having a same owner as the one or more records.

24. The method of claim 19, wherein the relationship includes the one or more objects without location information having a similar time stamp as the one or more records.

25. The method of claim 19, further comprising the step of generating a geo-located object data sheet for the explicitly located object and generating one or more geo-located object data sheets for the one or more objects with derived locations.

26. The method of claim 19, wherein the plurality of objects includes at least one of a picture, a video, an audio, a sensor measurement, a map, a document, a recorded location log, an automotive telemetry, a weather report, and a news item.

27. The method of claim 19, further comprising the step of enabling a user to specify the location of one or more other objects without location information among the plurality of objects.

* * * * *